United States Patent
Huang et al.

(10) Patent No.: US 12,483,347 B2
(45) Date of Patent: Nov. 25, 2025

(54) MODE DIVISION MULTIPLEX FOR DATA AND REFERENCE SIGNALS IN ORBITAL ANGULAR MOMENTUM COMMUNICATION

(71) Applicant: QUALCOMM Incorporated, San Diego, CA (US)

(72) Inventors: Min Huang, Beijing (CN); Chao Wei, Beijing (CN); Jing Dai, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/695,600

(22) PCT Filed: Dec. 1, 2021

(86) PCT No.: PCT/CN2021/134745
§ 371 (c)(1),
(2) Date: Mar. 26, 2024

(87) PCT Pub. No.: WO2023/097546
PCT Pub. Date: Jun. 8, 2023

(65) Prior Publication Data
US 2024/0396660 A1  Nov. 28, 2024

(51) Int. Cl.
*H04J 14/00* (2006.01)
*H04B 7/0456* (2017.01)
*H04L 5/00* (2006.01)

(52) U.S. Cl.
CPC ............ *H04J 14/07* (2023.08); *H04B 7/0456* (2013.01); *H04L 5/0051* (2013.01); *H04L 5/0094* (2013.01)

(58) Field of Classification Search
CPC ... H04L 5/0048; H04L 5/0051; H04L 5/0023; H04L 5/0094; H04L 25/0224;
(Continued)

(56) References Cited

U.S. PATENT DOCUMENTS 11,088,752 B1 * 8/2021 Klemes ................. H04W 16/28
2010/0265842 A1 * 10/2010 Khandekar ........... H04W 72/29
370/252
(Continued)

FOREIGN PATENT DOCUMENTS

| EP | 3691150 A1 | 8/2020 |
| JP | 2017153018 A | 8/2017 |
| WO | 2021093591 A1 | 5/2021 |

OTHER PUBLICATIONS

International Search Report and Written Opinion—PCT/CN2021/134745—ISA/EPO—Aug. 25, 2022.
(Continued)

*Primary Examiner* — Eva Y Puente
(74) *Attorney, Agent, or Firm* — Shumaker & Sieffert

(57) ABSTRACT

Aspects of the disclosure relate to wireless communication including mode division multiplexing of data and reference signals using different orbital angular momentum (OAM) modes. An OAM transmitter may transmit a reference signal (RS) configuration information to an OAM receiver that indicates radio resources for a plurality of OAM modes. The OAM transmitter may further transmit data on a first OAM mode of the plurality of OAM modes using first radio resources of the radio resources indicated by the RS configuration information. The OAM transmitter may further transmit a reference signal on a second OAM mode of the plurality of OAM modes using the first radio resources of the radio resources indicated by the RS configuration information. The OAM receiver may receive the data on the first OAM mode and the reference signal on the second OAM mode. Other aspects, embodiments, and features are also claimed and described.

30 Claims, 15 Drawing Sheets

(58) Field of Classification Search
CPC . H04L 27/2639; H04L 1/1614; H04L 27/261;
H04L 5/00; H04B 7/0617; H04B 7/0456;
H04B 7/0695; H04B 7/0413; H04B
7/063; H04B 7/0639; H04B 7/0697;
H04B 7/0626; H04W 24/02; H04W
72/23; H04W 72/542; H04W 16/28;
H04W 24/10; H04W 24/08; H04W
72/046; H04W 72/21

See application file for complete search history.

(56) References Cited

U.S. PATENT DOCUMENTS

| | | | |
|---|---|---|---|
| 2016/0127073 A1 | 5/2016 | Ashrafi et al. | |
| 2019/0020434 A1 | 1/2019 | Adachi et al. | |
| 2020/0296599 A1 | 9/2020 | Sasaki et al. | |
| 2024/0048209 A1* | 2/2024 | Huang | H01Q 1/24 |
| 2024/0088990 A1* | 3/2024 | Zhang | H04W 4/08 |
| 2024/0243884 A1* | 7/2024 | Huang | H04B 7/10 |
| 2024/0356237 A1* | 10/2024 | Huang | H04B 7/0456 |
| 2025/0132798 A1* | 4/2025 | Huang | H04B 7/0626 |

OTHER PUBLICATIONS

Chen R., et al., "Orbital Angular Momentum Waves: Generation, Detection, and Emerging Applications", IEEE Communications Surveys & Tutorials, IEEE, USA, vol. 22, No. 2, Nov. 8, 2019, pp. 840-868, XP011790754, Introduction, p. 840, paragraph I—p. 841, Radio OAM, p. 845, paragraph B—p. 847.
Supplementary European Search Report—EP21965983—Search Authority—The Hague—Jul. 10, 2025.

* cited by examiner

MODE DIVISION MULTIPLEX FOR DATA AND REFERENCE SIGNALS IN ORBITAL ANGULAR MOMENTUM COMMUNICATION

This application is a national stage application under 35 U.S.C. § 371 of PCT Application No. PCT/CN2021/134745, filed Dec. 1, 2021. The entire content of PCT Application No. PCT/CN2021/134745 is incorporated herein by reference in its entirety.

TECHNICAL FIELD

The technology discussed below relates generally to wireless communication systems, and more particularly, to modulation of transmission waveforms and multiplexing of data streams. For example, some aspects of the disclosed technology can provide and enable techniques for multiplexing data and reference signal transmissions using orbital angular momentum (OAM) mode-division multiplexing.

INTRODUCTION

In wireless communication, information is transmitted over electromagnetic radiation by modulating a carrier signal with one or more information signals. Many techniques for modulating a carrier signal are used in the art, including various analog and digital modulation techniques such as frequency modulation (FM), amplitude modulation (AM), phase-shift keying (PSK), and quadrature amplitude modulation (QAM), among numerous others. In a typical cellular wireless communication system, many such signals can be multiplexed (e.g., combined) onto a suitable carrier or band to enable simultaneous communication between multiple devices. Once again, many techniques for multiplexing and multiple access are used in the art, including frequency-division multiplexing (FDM), time-division multiplexing (TDM), and orthogonal frequency-division multiplexing (OFDM), among many others.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, an apparatus for wireless communication is disclosed. The apparatus includes a processor and a transceiver coupled to the processor. The apparatus is configured to transmit, via the transceiver, a reference signal (RS) configuration information. The RS configuration information indicates radio resources for a plurality of orbital angular momentum (OAM) modes. The apparatus is further configure to transmit, via the transceiver, data on a first OAM mode of the plurality of OAM modes using first radio resources of the radio resources indicated by the RS configuration information; and to transmit, via the transceiver, a reference signal on a second OAM mode of the plurality of OAM modes using the first radio resources of the radio resources indicated by the RS configuration information.

In another example, a method for wireless communication is disclosed. The method includes transmitting, via a transceiver, reference signal (RS) configuration information. The RS configuration information indicates radio resources for a plurality of orbital angular momentum (OAM) modes. The method further includes transmitting, via the transceiver, data on a first OAM mode of the plurality of OAM modes using first radio resources of the radio resources indicated by the RS configuration information; and transmitting, via the transceiver, a reference signal on a second OAM mode of the plurality of OAM modes using the first radio resources of the radio resources indicated by the RS configuration information.

In yet another example, an apparatus for wireless communication is disclosed. The apparatus includes a processor; and a transceiver coupled to the processor. The apparatus is configured to receive, via the transceiver, reference signal (RS) configuration information. The RS configuration information indicates radio resources for a plurality of orbital angular momentum (OAM) modes. The apparatus is further configured to receive, via the transceiver, data on a first OAM mode of the plurality of OAM modes using first radio resources in accordance with the RS configuration information; and to receive, via the transceiver, a reference signal on a second OAM mode of the plurality of OAM modes using the first radio resources in accordance with the RS configuration information.

In yet another example, a method for wireless communication is disclosed. The method includes receiving, via a transceiver, reference signal (RS) configuration information. The RS configuration information indicates radio resources for a plurality of orbital angular momentum (OAM) modes. The method further includes receiving, via the transceiver, data on a first OAM mode of the plurality of OAM modes using first radio resources of the radio resources indicated by the RS configuration information; and receiving, via the transceiver, a reference signal on a second OAM mode of the plurality of OAM modes using the first radio resources of the radio resources indicated by the RS configuration information.

These and other aspects of the technology discussed herein will become more fully understood upon a review of the detailed description, which follows. Other aspects and features will become apparent to those of ordinary skill in the art, upon reviewing the following description of specific, exemplary embodiments in conjunction with the accompanying figures. While the following description may discuss various advantages and features relative to certain embodiments and figures, all embodiments can include one or more of the advantageous features discussed herein. In other words, while this description may discuss one or more embodiments as having certain advantageous features, one or more of such features may also be used in accordance with the various embodiments discussed herein. In similar fashion, while this description may discuss exemplary embodiments as device, system, or method embodiments, it should be understood that such exemplary embodiments can be implemented in various devices, systems, and methods.

DETAILED DESCRIPTION

Figure 1:
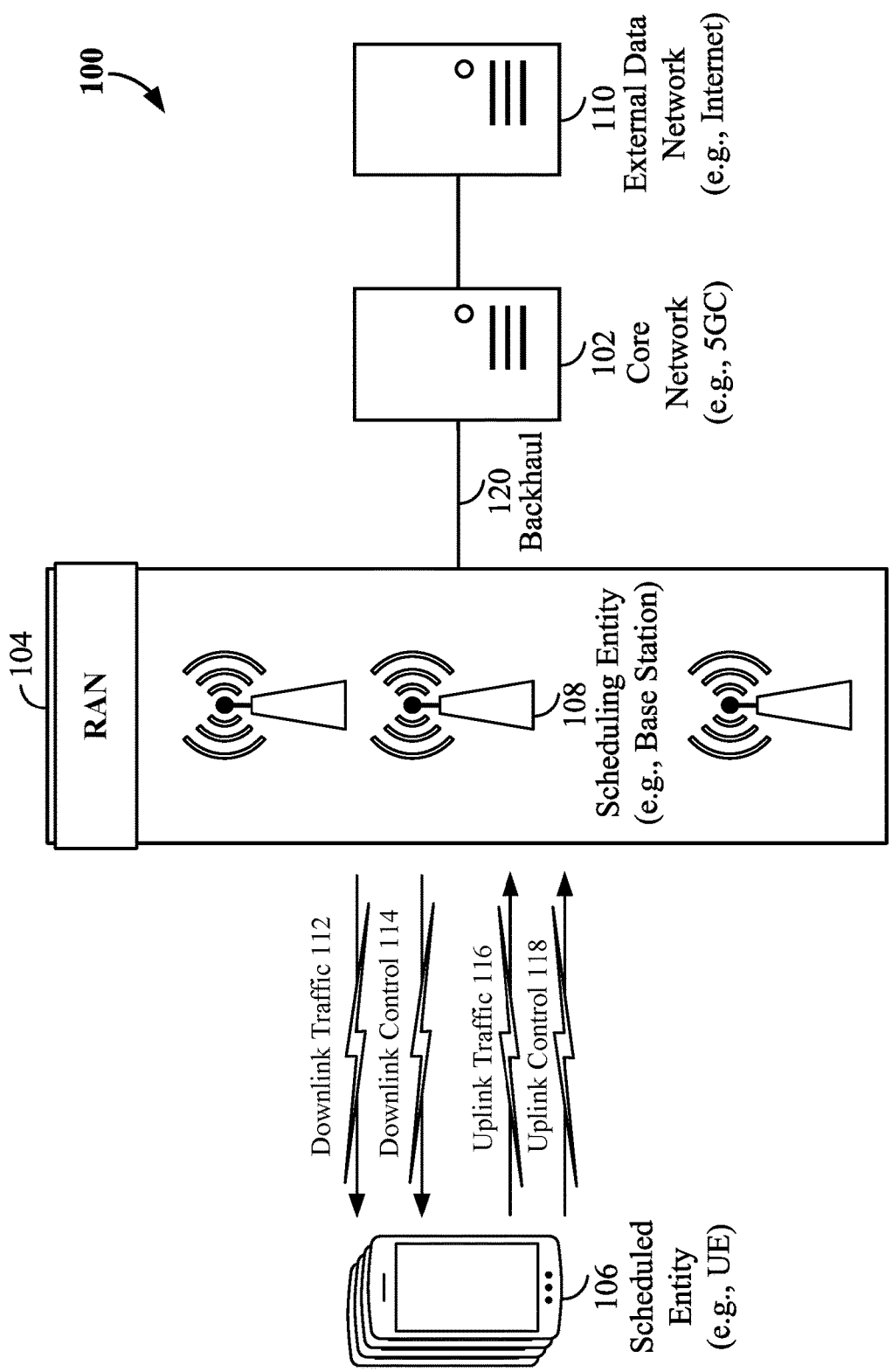
FIG. 1 is a schematic illustration of a wireless communication system according to some aspects of this disclosure.

In some aspects, this disclosure provides for a wireless communication technique that exploits an orbital angular momentum (OAM) property of electromagnetic (EM) waves for modulating a carrier to carry information, and/or for multiplexing information streams onto a common wireless resource. In particular, a transmitting device may transmit data and reference signals on multiple OAM modes using shared time and frequency resources. Here, the data may convey information and the reference signals may be used to perform channel estimation and/or estimate channel characteristics (e.g., channel gain). Other aspects, embodiments, and features are also described and claimed.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip (IC) embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may span over a spectrum from chip-level or modular components to non-modular, non-chip-level implementations and further to aggregate, distributed, or original equipment manufacturer (OEM) devices or systems incorporating one or more aspects of the disclosed technology. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that the disclosed technology may be practiced in a wide variety of devices, chip-level components, systems, distributed arrangements, end-user devices, etc. of varying sizes, shapes and constitution.

In communication systems, modulation is a technique for systematically varying a carrier signal in such a way that the transmitted signal contains information. Many techniques for modulating a carrier signal are used in the art, including various analog and digital modulation techniques. Modern wireless communication devices often employ quadrature amplitude modulation (QAM), where a pair of quadrature (orthogonal) carrier signals have their amplitudes controlled to represent a desired location in a complex plane (sometimes referred to as a Gauss plane).

And relatedly, multiplexing and multiple access are techniques for enabling simultaneous communication of multiple signals and/or devices on the same channel. For example, 5G New Radio (NR) specifications provide multiple access for uplink transmissions from mobile devices to base stations, and for multiplexing for downlink transmissions from base stations to mobile devices, utilizing orthogonal frequency division multiplexing (OFDM) with a cyclic prefix (CP). In addition, for uplink transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes. For example, a mobile device may provide for uplink multiple access utilizing time division multiple access (TDMA), code division multiple access (CDMA), frequency division multiple access (FDMA), sparse code multiple access (SCMA), resource spread multiple access (RSMA), orbital angular momentum (OAM) multiple access, coaxial multi-circle antenna multiple access, and/or other suitable multiple access schemes. Further, a base station may multiplex DL transmissions to UEs utilizing time division multiplexing (TDM), code division multiplexing (CDM), frequency division multiplexing (FDM), orthogonal frequency division multiplexing (OFDM), sparse code multiplexing (SCM), orbital angular momentum (OAM) multiplexing, coaxial multi-circle antenna multiplexing, and/or other suitable multiplexing schemes.

Orbital Angular Momentum (OAM)

An electromagnetic (EM) transmission can be characterized as a wave that carries momentum. In some examples, this momentum can include angular momentum, which includes a spin angular momentum (SAM) component, and an orbital angular momentum (OAM) component. In some cases, the SAM of the EM wave may be associated with the polarization of the EM wave. For example, an EM wave may be associated with different polarizations, such as left, right, and circular polarizations. Accordingly, the SAM of an EM wave may have multiple (e.g., two) degrees of freedom.

In some cases, the OAM of the EM wave may be associated with a field spatial distribution of the EM wave, which may be in the form of a helical or twisted wavefront shape. For example, an EM wave or light beam may be in a helical mode, which may also be referred to as an OAM mode; and such helical mode may be characterized by a wavefront that is shaped as a helix with an optical vortex in the center (e.g., at the beam axis), where each helical mode is associated with a different helical wavefront structure. The helical modes (e.g., OAM modes) may be defined or referred to by a mode index l, where a sign of the mode index l corresponds to a 'handedness' (e.g., left or right) of the helix or helices; and a magnitude of the mode index l (e.g., |l|) corresponds to a quantity of distinct but interleaved helices of the EM wave.

For example, for an EM wave associated with an OAM mode index of l=0, the EM wave is not helical, and the wavefronts of the EM wave are multiple disconnected surfaces (e.g., the EM wave is a sequence of parallel planes). For an EM wave associated with an OAM mode index of l=+1, the EM wave may propagate in a right-handed sense (e.g., the EM wave may form a right helix that rotates about the beam axis in a clockwise direction) and the wavefront of the EM wave may be shaped as a single helical surface with a step length equal to a wavelength $\lambda$ of the EM wave. Likewise, the phase delay over one revolution of the EM wave may be equal to $2\pi$. Similarly, for an OAM mode index of l=−1, the EM wave may propagate in a left-handed sense (e.g., the EM wave may form a left helix that rotates about the beam axis in a counter-clockwise direction) and the wavefront of the EM wave may be also be shaped as a single helical surface with a step length equal to the wavelength $\lambda$ of the EM wave. Likewise, the phase delay over one revolution of the EM wave may be equal to −$2\pi$.

In a further example, for an OAM mode index of l=+2, the EM wave may propagate in either a right-handed sense (if l=+2) or in a left-handed sense (if l=−2) and the wavefront of the EM wave may include two distinct but interleaved helical surfaces. In such examples, the step length of each helical surface may be equal to $\lambda/2$. Likewise, the phase delay over one revolution of the EM wave may be equal to ±$4\pi$. In general terms, a mode-l EM wave may propagate in either a right-handed sense or a left-handed sense (depending on the sign of l) and may include l distinct but interleaved helical surfaces with a step length of each helical surface equal to $\pi/|l|$. Likewise, the phase delay over one revolution of the EM wave may be equal to $2/\pi$. In some cases, an EM wave may be indefinitely extended to provide for a theoretically infinite number of degrees of freedom of the OAM of the EM wave (e.g., l∈Z, where Z is the unbounded set of integers). As such, the OAM of the EM wave may be associated with an infinite number of degrees of freedom.

OAM Modulation

In some examples, the OAM mode index l of an EM wave may correspond to or otherwise function as (e.g., be defined as) an additional dimension for signal or channel multiplexing. For example, each OAM mode or state (of which there may be an infinite number) may function similarly (or equivalently) to a communication channel, such as a sub-channel. In other words, an OAM mode or state may correspond to a communication channel, and vice-versa. For instance, a transmitting device or a receiving device may communicate separate signals using EM waves having different OAM modes or states similar to how a transmitting device or receiving device may communicate separate signals over different communication channels. In some aspects, such use of the OAM modes or states of an EM wave to carry different signals may be referred to as the use of OAM beams.

Additionally, in some examples, EM waves with different OAM modes (e.g., OAM states) may be mutually orthogonal to each other (e.g., in a Hilbert sense, in which a space may include an infinite set of axes and sequences may become infinite by way of always having another coordinate direction in which next elements of the sequence can go). Likewise, in a Hilbert sense, orthogonal OAM modes or states may correspond to orthogonal communication channels (e.g., orthogonal sequences transmitted over a communication channel) and, based on the potentially infinite number of OAM modes or states, a wireless communication system employing the use of OAM beams may theoretically achieve infinite capacity. Here, due to the mutual orthogonality among OAM modes, the waveform of one OAM mode generally cannot be received by a receiver aperture configured for a different OAM mode. In theory, an infinite number of OAM states or modes may be twisted together for multiplexing, and the capacity of the OAM link can approach infinity while preserving orthogonality between signals carried by different OAM modes (e.g., indices/). In practice, however, due to non-ideal factors (e.g., Tx/Rx axial and/or position placement error, propagation divergence, and the like), there may be crosstalk among OAM modes at the receiver, and thus a reduced number of concurrent OAM modes may be implemented between wireless devices. In some cases, a transmitting device may generate such OAM beams using spiral phase plate (SPP) or uniform circular array (UCA) configurations, such as discussed with reference to FIGS. 7, 8, and 9.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G or 5G NR. In some examples, the RAN 104 may operate under a hybrid of 5G NR and Evolved Universal Terrestrial Radio Access Network (eUTRAN) standards, often referred to as Long-Term Evolution (LTE). 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, those skilled in the art may variously refer to a "base station" as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network (RAN) 104 supports wireless communication for multiple mobile apparatuses. Those skilled in the art may refer to a mobile apparatus as a UE, as in 3GPP specifications, but may also refer to a UE as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (aka a UE) need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data. A mobile apparatus may additionally include two or more disaggregated devices in communication with one another, including, for example, a wearable device, a haptic sensor, a limb movement sensor, an eye movement sensor, etc., paired with a smartphone. In various examples, such disaggregated devices may communicate directly with one another over any suitable communication channel or interface or may indirectly communicate with one another over a network (e.g., a local area network or LAN).

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
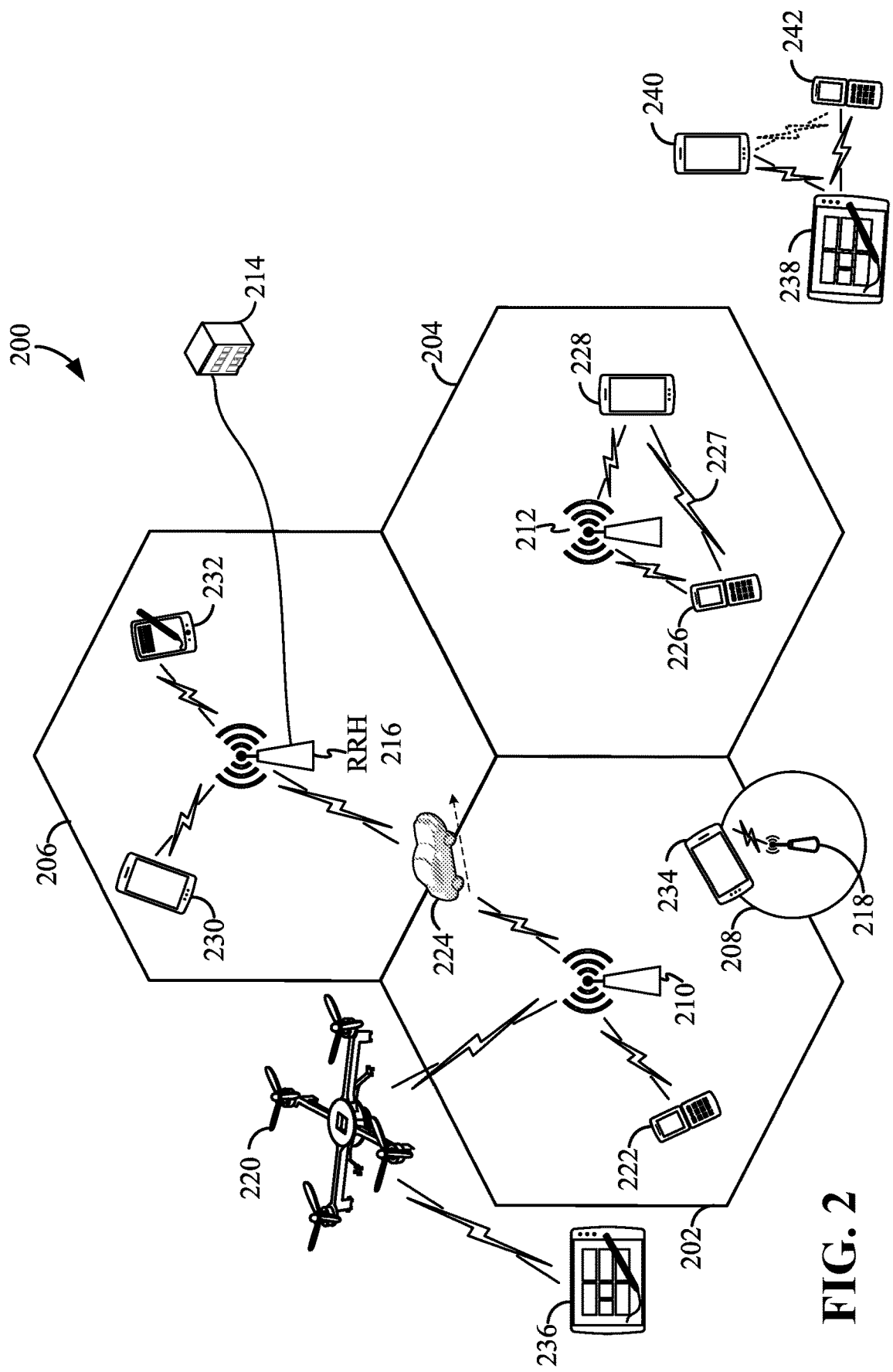
FIG. 2 is a conceptual illustration of an example of a radio access network according to some aspects of this disclosure.

FIG. 2 provides a schematic illustration of a RAN 200, by way of example and without limitation. In some examples, the RAN 200 may be the same as the RAN 104 described above and illustrated in FIG. 1. The geographic area covered by the RAN 200 may be divided into cellular regions (cells) that a user equipment (UE) can uniquely identify based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

FIG. 2 shows two base stations 210 and 212 in cells 202 and 204; and shows a third base station 214 controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

The RAN 200 may include any number of wireless base stations and cells. Further, a RAN may include a relay node to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

The air interface in the RAN 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time utilizing a given resource. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
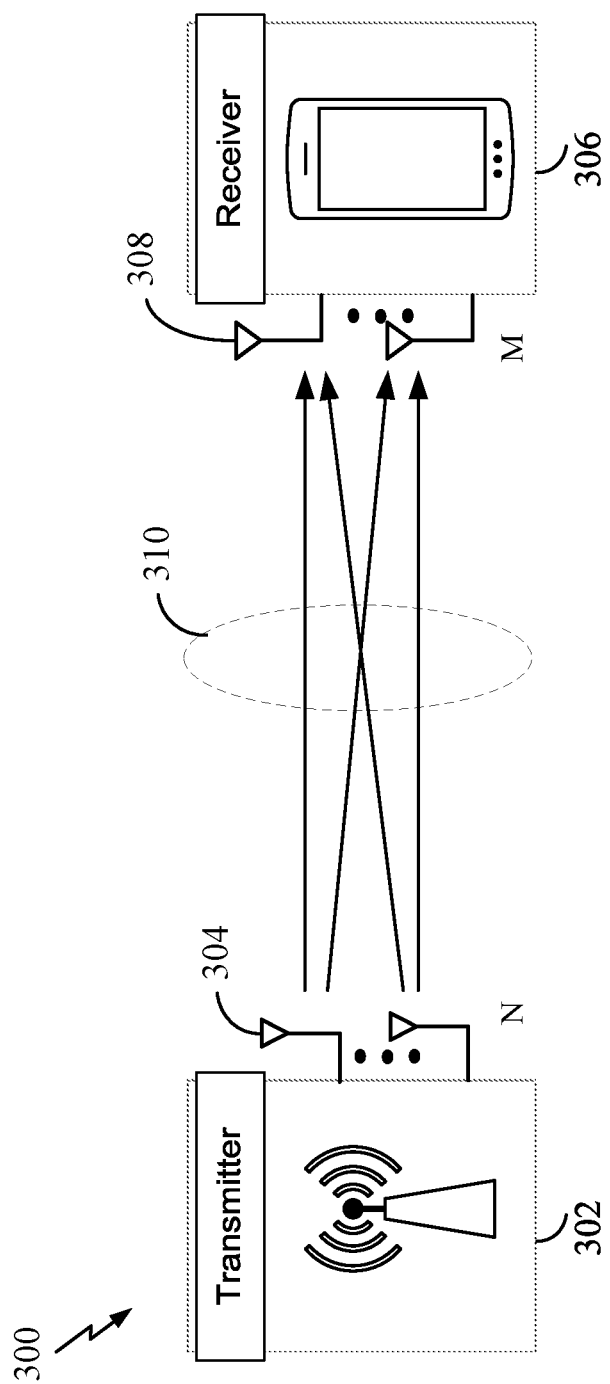
FIG. 3 is a block diagram illustrating a wireless communication system supporting multiple-input multiple-output (MIMO) communication according to some aspects of this disclosure.

In some aspects of the disclosure, the scheduling entity and/or scheduled entity may be configured with multiple antennas for beamforming and/or multiple-input multiple-output (MIMO), and/or orbital angular momentum (OAM) modulation technology. FIG. 3 illustrates an example of a wireless communication system 300 with multiple antennas, supporting beamforming, MIMO, and OAM communications. In some examples, the system of FIG. 3 may implement aspects of RAN 200. The use of such multiple antenna technology enables the wireless communication system to exploit the spatial domain to support spatial multiplexing, beamforming, and transmit diversity.

Beamforming generally refers to directional signal transmission or reception. For a beamformed transmission, a transmitting device may precode, or control the amplitude and phase of each antenna in an array of antennas to create a desired (e.g., directional) pattern of constructive and destructive interference in the wavefront. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

In a MIMO system, spatial multiplexing may be used to transmit multiple different streams of data, also referred to as layers, simultaneously on the same time-frequency resource. In some examples, a transmitter 302 may send multiple data streams to a single receiver. In this way, a MIMO system takes advantage of capacity gains and/or increased data rates associated with using multiple antennas in rich scattering environments where channel variations can be tracked. Here, the receiver 306 may track these channel variations and provide corresponding feedback to the transmitter 302. In one example case, as shown in FIG. 3, a rank-2 (i.e., including 2 data streams) spatial multiplexing transmission on a 2×2 MIMO antenna configuration will transmit two data streams via two transmit antennas 304. The signal from each transmit antenna 304 reaches each receive antenna 308 along a different signal path 310. The receiver 306 may then reconstruct the data streams using the received signals from each receive antenna 308.

In some examples, a transmitter may send multiple data streams to multiple receivers. This is generally referred to as multi-user MIMO (MU-MIMO). In this way, a MU-MIMO system exploits multipath signal propagation to increase the overall network capacity by increasing throughput and spectral efficiency, and reducing the required transmission energy. This is achieved by a transmitter 302 spatially precoding (i.e., multiplying the data streams with different weighting and phase shifting) each data stream (in some examples, based on known channel state information) and then transmitting each spatially precoded stream through multiple transmit antennas to the receiving devices using the same allocated time-frequency resources. A receiver (e.g., receiver 306) may transmit feedback including a quantized version of the channel so that the transmitter 302 can schedule the receivers with good channel separation. The spatially precoded data streams arrive at the receivers with different spatial signatures, which enables the receiver(s) (in some examples, in combination with known channel state information) to separate these streams from one another and recover the data streams destined for that receiver. In the other direction, multiple transmitters can each transmit a spatially precoded data stream to a single receiver, which enables the receiver to identify the source of each spatially precoded data stream.

The number of data streams or layers in a MIMO or MU-MIMO (generally referred to as MIMO) system corresponds to the rank of the transmission. In general, the rank of a MIMO system is limited by the number of transmit or receive antennas 304 or 308, whichever is lower. In addition, the channel conditions at the receiver 306, as well as other considerations, such as the available resources at the transmitter 302, may also affect the transmission rank. For example, a base station in a RAN (e.g., transmitter 302) may assign a rank (and therefore, a number of data streams) for a DL transmission to a particular UE (e.g., receiver 306) based on a rank indicator (RI) the UE transmits to the base station. The UE may determine this RI based on the antenna configuration (e.g., the number of transmit and receive antennas) and a measured signal-to-interference-and-noise ratio (SINR) on each of the receive antennas. The RI may indicate, for example, the number of layers that the UE may support under the current channel conditions. The base station may use the RI along with resource information (e.g., the available resources and amount of data to be scheduled for the UE) to assign a DL transmission rank to the UE.

The transmitter 302 determines the precoding of the transmitted data stream or streams based, e.g., on known channel state information of the channel on which the transmitter 302 transmits the data stream(s). For example, the transmitter 302 may transmit one or more suitable reference signals (e.g., a channel state information reference signal, or CSI-RS) that the receiver 306 may measure. The receiver 306 may then report measured channel quality information (CQI) back to the transmitter 302. This CQI generally reports the current communication channel quality, and in some examples, a requested transport block size (TBS) for future transmissions to the receiver. In some examples, the receiver 306 may further report a precoding matrix indicator (PMI) to the transmitter 302. This PMI generally reports the receiver's 306 preferred precoding matrix for the transmitter 302 to use, and may be indexed to a predefined codebook. The transmitter 302 may then utilize this CQI/PMI to determine a suitable precoding matrix for transmissions to the receiver 306.

In Time Division Duplex (TDD) systems, the UL and DL may be reciprocal, in that each uses different time slots of the same frequency bandwidth. Therefore, in TDD systems, a transmitter 302 may assign a rank for DL MIMO transmissions based on an UL SINR measurement (e.g., based on a sounding reference signal (SRS) or other pilot signal transmitted from the receiver 306). Based on the assigned rank, the transmitter 302 may then transmit a channel state information reference signal (CSI-RS) with separate sequences for each layer to provide for multi-layer channel estimation. From the CSI-RS, the receiver 306 may measure the channel quality across layers and resource blocks. The receiver 306 may then transmit a CSI report (including, e.g., CQI, RI, and PMI) to the transmitter 302 for use in updating the rank and assigning resources for future DL transmissions.

In some cases, the RAN 300 may be an example of or otherwise support an OAM-based communication system and a transmitting device 302 and/or a receiving device 306 may communicate via OAM beams. In some examples, a transmitting device 302 or a receiving device 306 may generate and steer an OAM beam based on selecting a set of antenna elements from a planar array of antenna elements (e.g., a planar array on the transmitting device 302 or a receiving device 306 that may be used for MIMO communications) based on which antenna elements fall within a determined area on the planar array associated with a uniform circular array (UCA) for OAM communications. Additionally or alternatively, one or more transmitting devices 302 or receiving devices 306 may include components that provide for spiral phase plate (SPP)-based OAM communications.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes. For example, a UE may provide for UL multiple access utilizing time division multiple access (TDMA), code division multiple access (CDMA), frequency division multiple access (FDMA), sparse code multiple access (SCMA), resource spread multiple access (RSMA), or other suitable multiple access schemes. Further, a base station may multiplex DL transmissions to UEs utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 4:
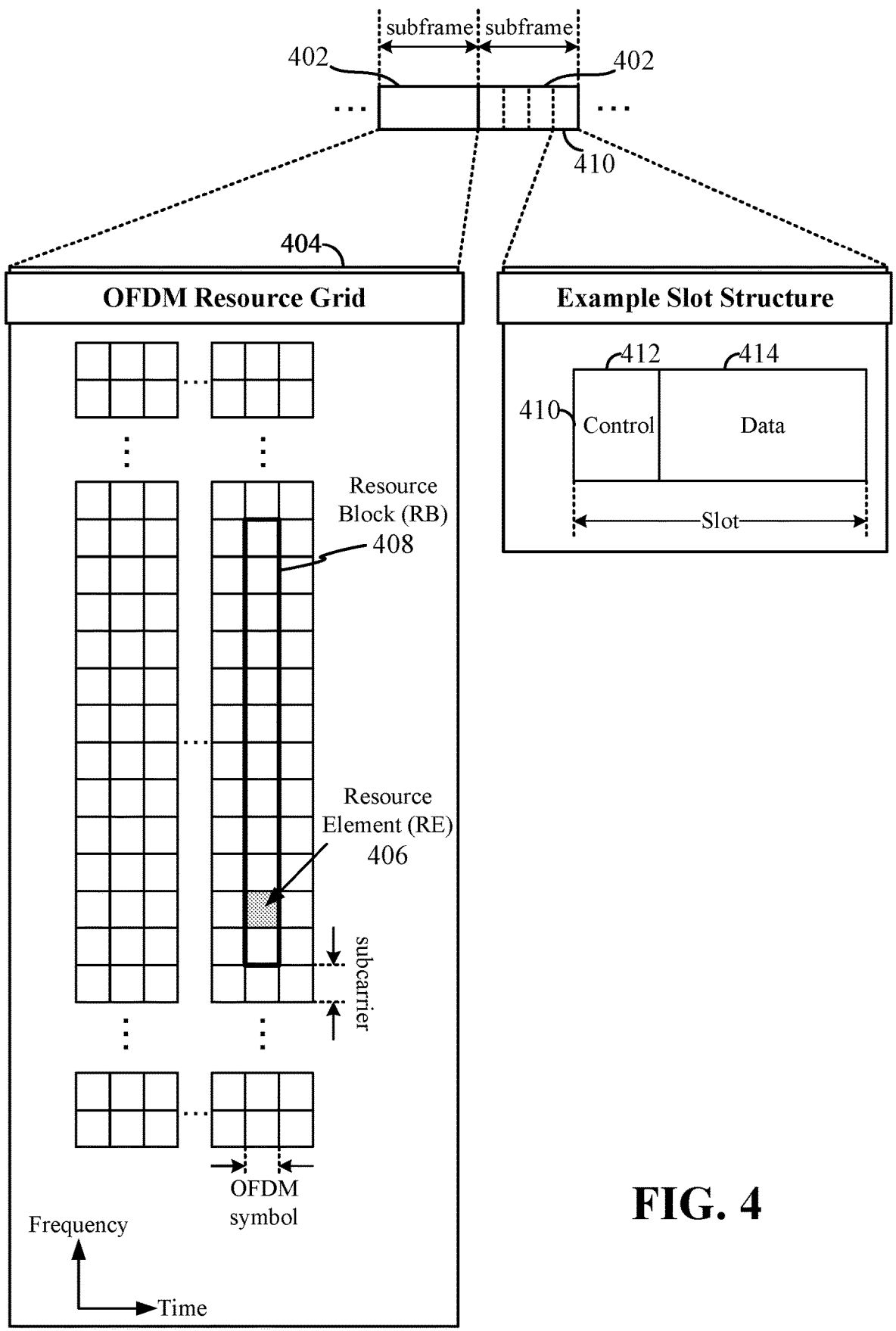
FIG. 4 is a schematic illustration of an organization of wireless resources in an air interface utilizing orthogonal frequency division multiplexing (OFDM) according to some aspects of this disclosure.

FIG. 4 schematically illustrates various aspects of the present disclosure with reference to an OFDM waveform. Those of ordinary skill in the art should understand that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

In some examples, a frame may refer to a predetermined duration of time (e.g., 10 ms) for wireless transmissions. And further, each frame may consist of a set of subframes (e.g., 10 subframes of 1 ms each). A given carrier may include one set of frames in the UL, and another set of frames in the DL. FIG. 4 illustrates an expanded view of an exemplary DL subframe 402, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may schematically represent time-frequency resources for a given antenna port. That is, in a MIMO implementation with multiple antenna ports available, a corresponding multiple number of resource grids 404 may be available for communication. For example, as described below, different OAM modes may be orthogonal when transmitted using the same time, frequency, and/or code resources, and thus may be associated with independent resource grids.

The resource grid 404 is divided into multiple resource elements (REs) 406. An RE, which is 1 subcarrier×1 symbol, is the smallest discrete part of the time-frequency grid, and may contain a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. The present disclosure assumes, by way of example, that a single RB such as the RB 408 entirely corresponds to a single direction of communication (either transmission or reception for a given device).

A UE generally utilizes only a subset of the resource grid 404. An RB may be the smallest unit of resources that a scheduler can allocate to a UE. Thus, the more RBs scheduled for a UE, and the higher the modulation scheme chosen for the air interface, the higher the data rate for the UE.

In this illustration, the RB 408 occupies less than the entire bandwidth of the subframe 402, with some subcarriers illustrated above and below the RB 408. In a given implementation, the subframe 402 may have a bandwidth corresponding to any number of one or more RBs 408. Further, the RB 408 is shown occupying less than the entire duration of the subframe 402, although this is merely one possible example.

Each 1 ms subframe 402 may consist of one or multiple adjacent slots. In FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). A base station may in some cases transmit these mini-slots occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within an RB 408 may carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry one or more DL control channels. These DL control channels include DL control information 114 (DCI) that generally carries information originating from higher layers, such as a physical broadcast channel (PBCH), a physical downlink control channel (PDCCH), etc., to one or more scheduled entities 106. In addition, the transmitting device may allocate one or more DL REs to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

A base station may transmit the synchronization signals PSS and SSS (collectively referred to as SS), and in some examples, the PBCH, in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other nonlimiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 406 to carry one or more UL control channels, such as a physical uplink control channel (PUCCH), a physical random access channel (PRACH), etc. These UL control channels include UL control information 118 (UCI) that generally carries information originating from higher layers. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the UL control channel 118 (e.g., a PUCCH), the scheduling entity 108 may transmit downlink control information (DCI) 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein a receiving device can check the integrity of packet transmissions for accuracy, e.g., utilizing any suitable integrity checking mechanism, such as a checksum or a cyclic redundancy check (CRC). If the receiving device confirms the integrity of the transmission, it may transmit an ACK, whereas if not confirmed, it may transmit a NACK. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. The RAN may provide this system information utilizing minimum system information (MSI), and other system information (OSI). The RAN may periodically broadcast the MSI over the cell to provide the most basic information a UE requires for initial cell access, and for enabling a UE to acquire any OSI that the RAN may broadcast periodically or send on-demand. In some examples, a network may provide MSI over two different downlink channels. For example, the PBCH may carry a master information block (MIB), and the PDSCH may carry a system information block type 1 (SIB1). Here, the MIB may provide a UE with parameters for monitoring a control resource set. The control resource set may thereby provide the UE with scheduling information corresponding to the PDSCH, e.g., a resource location of SIB1. In the art, SIB1 may be referred to as remaining minimum system information (RMSI).

OSI may include any SI that is not broadcast in the MSI. In some examples, the PDSCH may carry a plurality of SIBs, not limited to SIB1, discussed above. Here, the RAN may provide the OSI in these SIBs, e.g., SIB2 and above.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

Figure 5:
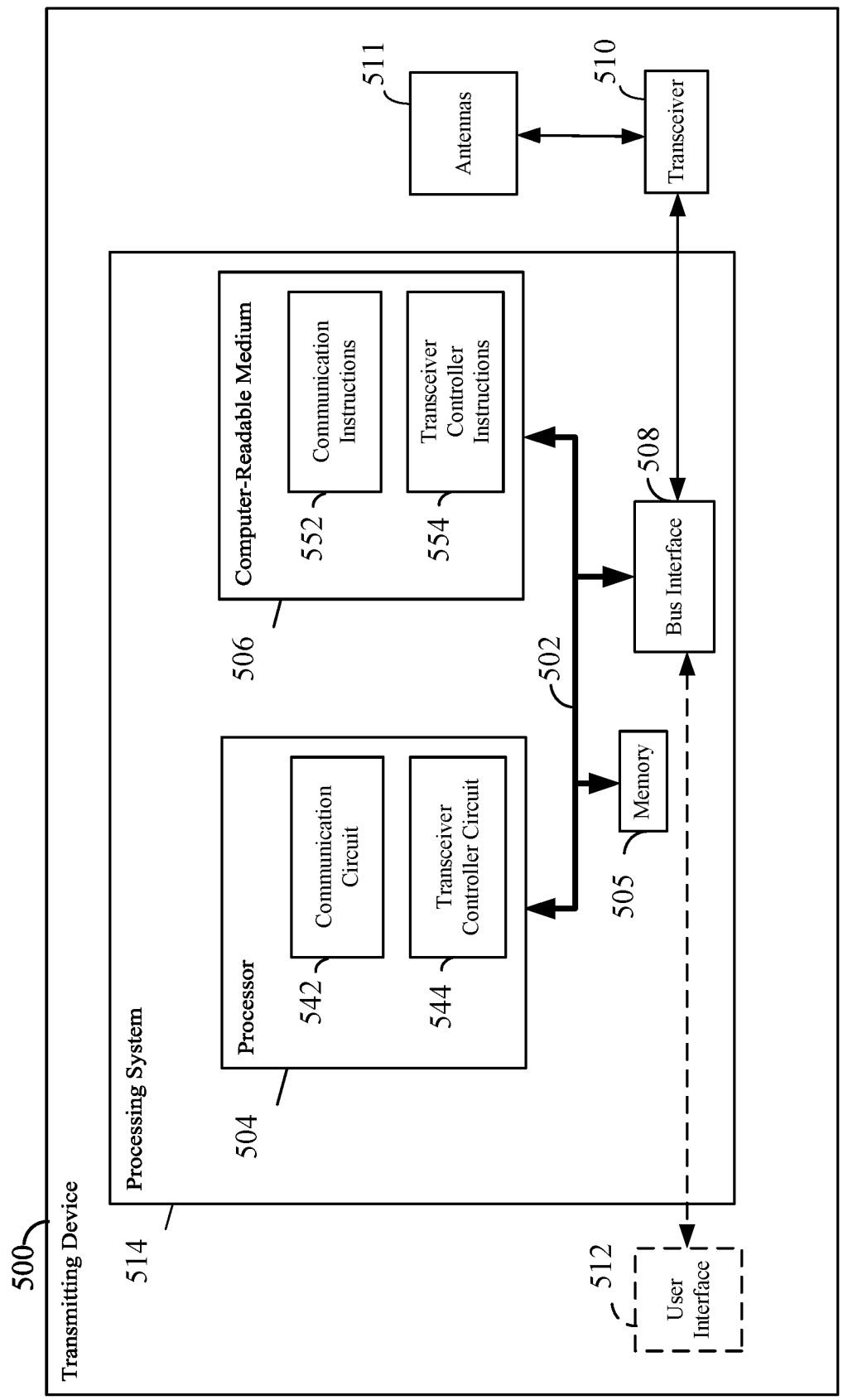
FIG. 5 is a block diagram conceptually illustrating an example of a hardware implementation for a transmitting device according to some aspects of the disclosure.

FIG. 5 is a block diagram illustrating an example of a hardware implementation for a transmitting device 500 employing a processing system 514. For example, the transmitting device 500 may be a user equipment (UE), a base station, or any other wireless communication node, e.g., as illustrated in any one or more of FIG. 1, 2, 3, 11, or 13. Although the transmitting device 500 may be generally described in the context of transmitting signals, the transmitting device 500 may also be a bidirectional communication device that receives signals. For example, the transmitting device 500 may receive signals simultaneously with transmitting signals and/or at times when the transmitting device 500 is not transmitting signals.

The transmitting device 500 may include a processing system 514 having one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 700 may be configured to perform any one or more of the functions described herein. For example, the processor 504, as utilized in a transmitting device 500, may be configured (e.g., in coordination with the memory 505) to implement any one or more of the processes and procedures described below and illustrated in FIGS. 11, 13, and 14.

The processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510.

The transceiver 510 provides a communication interface or means for communicating with various other apparatus over a transmission medium. In some aspects, the transceiver 510 includes (or is coupled to) a plurality of antennas 511. The plurality of antennas 511 may be configured similar to the spiral phase plate (SPP) antennas described below and illustrated in FIG. 7; similar to the uniform circular array (UCA) antennas described below and illustrated in FIG. 8; similar to the coaxial multi-circle UCA configuration described below and illustrated in FIG. 9; or some combination of two or more of the above. In some aspects, any structures that enable OAM multiplexing of electromagnetic signals (e.g., RF signals, light signals, etc.) may apply, including but not limited to UCA antennas and SPP antennas, which are described as examples. The plurality of antennas 511 may include or otherwise be configured using any other suitably configured phase plates, spatial modulators, integrated circuits, any other suitable components, and/or any suitable combination thereof, for transmission over any suitable medium including a wireless air interface, an optical fiber, etc.

Depending upon the nature of the apparatus, a user interface 512 (e.g., keypad, display, speaker, microphone, joystick) may also be provided. Of course, such a user interface 512 is optional, and some examples, such as a base station, may omit it.

In some aspects of the disclosure, the processor 504 may include communication circuitry 542 configured (e.g., in coordination with the memory 505) for various functions, including, e.g., receiving an information stream (e.g., a sequence of bits) for transmission and coordinating with a transceiver controller circuit 544 and/or transceiver controller instructions 544 to transmit suitable waveform to communicate data and/or transmit reference signals using one or more OAM modes, to receive information (e.g., a CSI report), and/or to adjust transmission parameters based on received information (e.g., based on a CSI report). For example, the communication circuitry 542 may be configured to implement one or more of the functions described below in relation to FIG. 11, including, e.g., blocks 1112, 1118, and/or 1128; in relation to FIG. 13, including, e.g., blocks 1315, 1325, and/or 1335; and/or in relation to FIG. 14, including, e.g., blocks 1410, 1420, and/or 1430.

In some further aspects of the disclosure, the processor 504 may include a transceiver controller 544 configured (e.g., in coordination with the memory 505 and/or the transceiver 510) for various functions, including, e.g., transmitting a suitable waveform (e.g., information or data stream) and/or reference signal (e.g., DM-RS, CSI-RS, etc.), receiving information (e.g., a CSI report), and/or adjusting transmission parameters based on received information (e.g., based on a CSI report) as disclosed herein. For example, the transceiver controller 544 may be configured to implement one or more of the functions described below in relation to FIG. 11, including, e.g., blocks 1112, 1118, and/or 1128; in relation to FIG. 13, including, e.g., blocks 1315, 1325, and/or 1335; and/or in relation to FIG. 14, including, e.g., blocks 1410, 1420, and/or 1430.

The processor 504 is responsible for managing the bus 502 and general processing, including the execution of software stored on the computer-readable medium 506. The software, when executed by the processor 504, causes the processing system 514 to perform the various functions described below for any particular apparatus. The processor 504 may also use the computer-readable medium 506 and the memory 505 for storing data that the processor 504 manipulates when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 506 may store computer-executable code that includes communication instructions 562 that configure a transmitting device 500 for various functions, including, e.g., receiving an information stream (e.g., a sequence of bits) for transmission and coordinating with a transceiver controller circuit 544 and/or transceiver controller instructions 544 to transmit suitable waveform to communicate data and/or transmit reference signals using one or more OAM modes, to receive information (e.g., a CSI report), and/or to adjust transmission parameters based on received information (e.g., based on a CSI report). For example, the communication instructions 562 may be configured to cause a transmitting device 500 to implement one or more of the functions described below in relation to FIG. 11, including, e.g., blocks 1112, 1118, and/or 1128; in relation to FIG. 13, including, e.g., blocks 1315, 1325, and/or 1335; and/or in relation to FIG. 14, including, e.g., blocks 1410, 1420, and/or 1430.

In some further examples, the computer-readable storage medium 506 may store computer-executable code that includes transceiver controller instructions 564 that configure a transmitting device 500 for various functions, including, e.g., transmitting a suitable waveform (e.g., information or data stream) and/or reference signal (e.g., DM-RS, CSI-RS, etc.), receiving information (e.g., a CSI report), and/or adjusting transmission parameters based on received information (e.g., based on a CSI report), as disclosed herein. For example, the transceiver controller instructions 564 may be configured to cause a transmitting device 500 to implement one or more of the functions described below in relation to FIG. 11, including, e.g., blocks 1112, 1118, and/or 1128; in relation to FIG. 13, including, e.g., blocks 1315, 1325, and/or 1335; and/or in relation to FIG. 14, including, e.g., blocks 1410, 1420, and/or 1430.

In one configuration, the transmitting device 500 for wireless communication includes means for transmitting DMRS configuration information, means for transmitting CSI report configuration information, means for transmitting PDSCH communications without data-DMRS mode division multiplexing (MDM), means for transmitting PDSCH communications with data-DMRS MDM, means for transmitting a CSI-RS for an OAM mode with data-DMRS MDM, means for transmitting a CSI-RS for an OAM mode without data-DMRS MDM, and means for receiving CSI reports. In one aspect, the aforementioned means may be the processor(s) 504 or processing system 514 shown in FIG. 5 configured to perform the functions recited by the aforementioned means. In another aspect, the aforementioned means may be a circuit or any apparatus configured to perform the functions recited by the aforementioned means.

Figure 11:
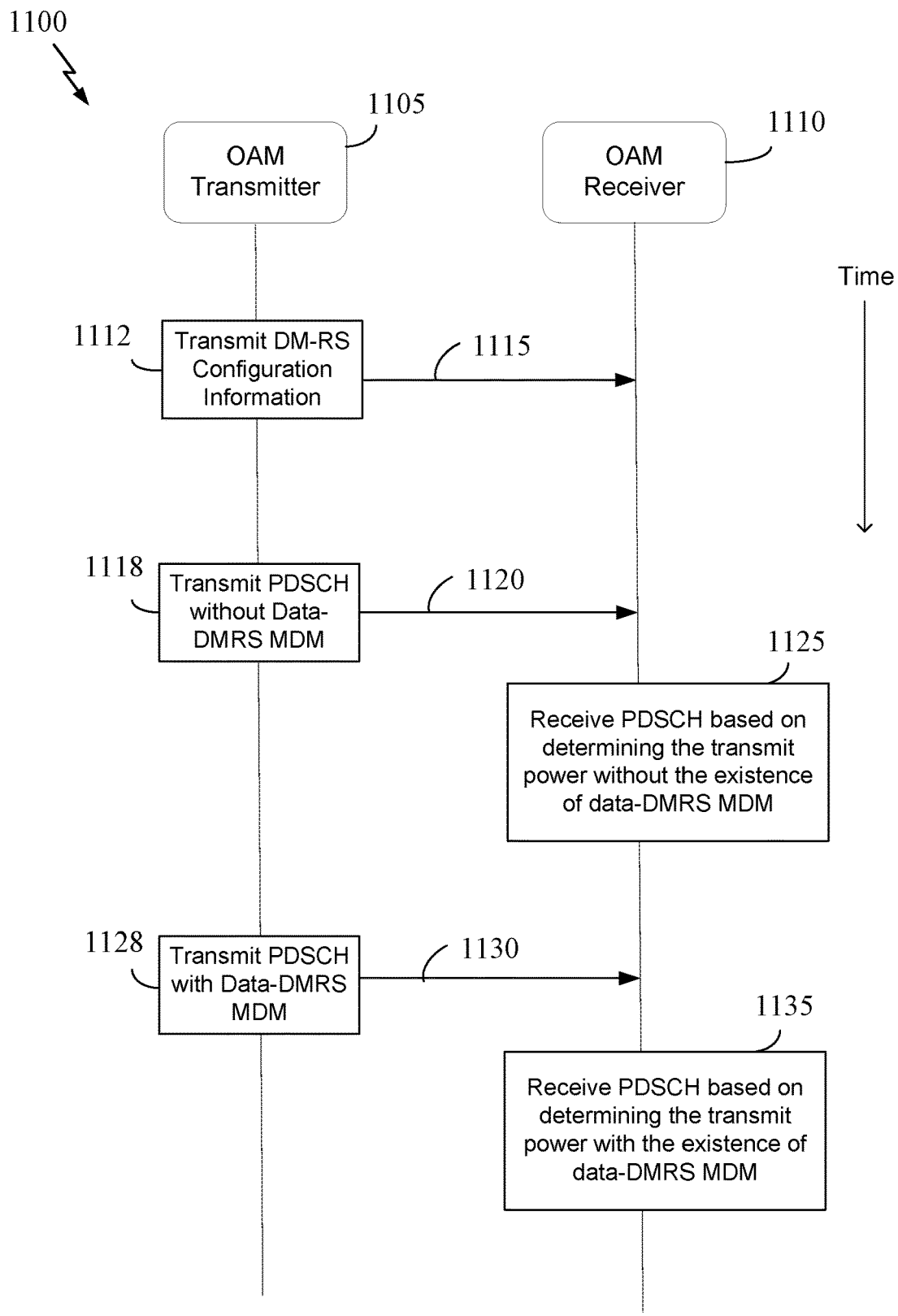
FIG. 11 is a diagram illustrating an exemplary process for mode-division multiplexing a reference signal and data signal on shared time and frequency resources using different OAM modes in accordance with some aspects of this disclosure.
Figure 13:
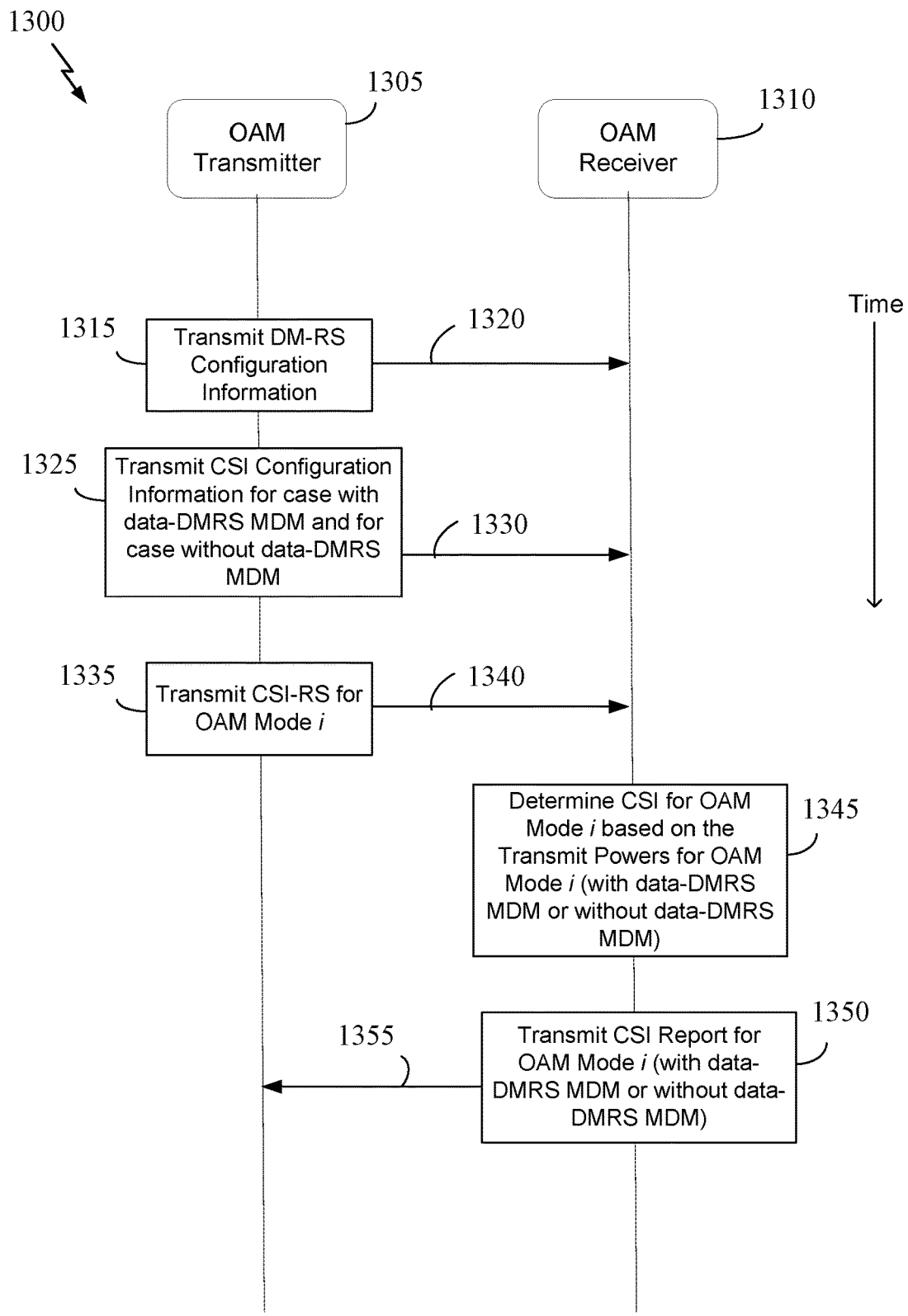
FIG. 13 is a diagram 1300 illustrating an exemplary process for channel state estimation and reporting on a channel with mode-division multiplexing of a reference signal and data signal on shared time and frequency resources using different OAM modes in accordance with some aspects of this disclosure
Figure 14:
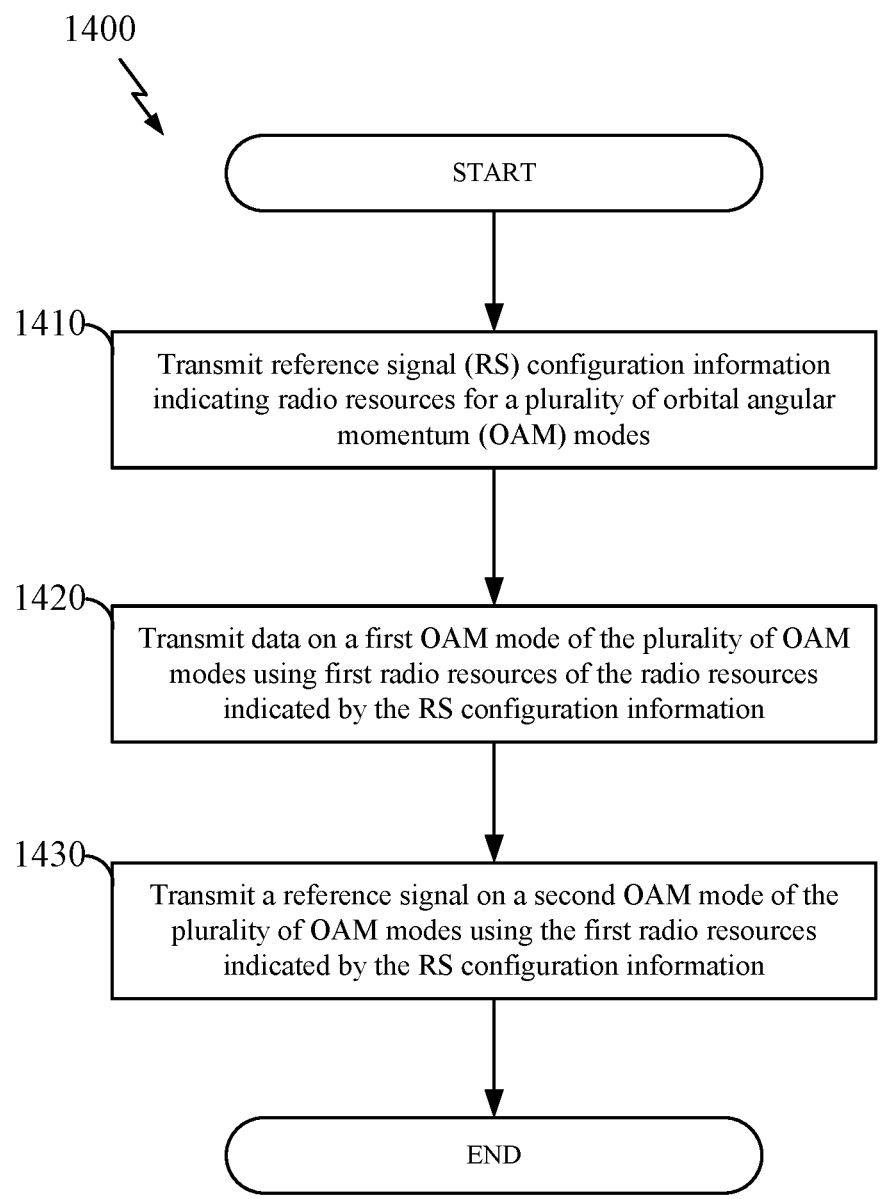
FIG. 14 is a flow chart illustrating an exemplary process at a transmitting device for transmitting mode-division multiplexed communications according to some aspects of this disclosure.

Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described in any one of the FIGS. 1, 2, 3, 11, and/or, and utilizing, for example, the processes and/or algorithms described herein in relation to FIGS. 11, 13, and 14.

Figure 6:
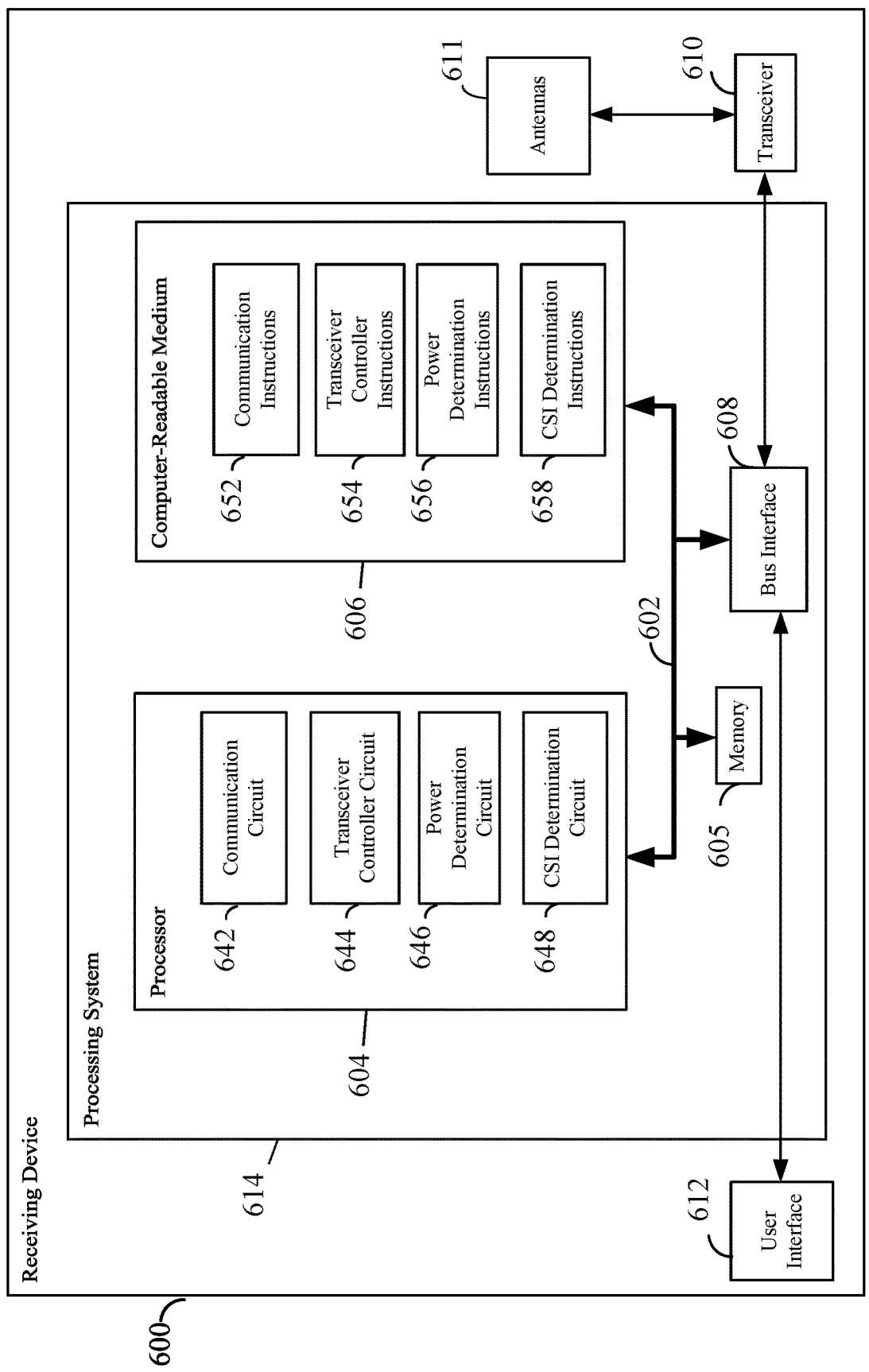
FIG. 6 is a block diagram conceptually illustrating an example of a hardware implementation for a receiving device according to some aspects of the disclosure.

FIG. 6 is a conceptual diagram illustrating an example of a hardware implementation for an exemplary receiving device 600 employing a processing system 614. In accordance with various aspects of the disclosure, a processing system 614 may include an element, or any portion of an element, or any combination of elements having one or more processors 604. For example, the receiving device 600 may be a user equipment (UE), a base station, or any other wireless communication node, e.g., as illustrated in any one or more of FIGS. 1, 2, 3, 11, and/or 13. Although the receiving device 600 may be generally described in the context of receiving signals, the receiving device 600 may also be a bidirectional communication device that transmits signals. For example, the receiving device 600 may transmit signals simultaneously with receiving signals and/or at times when the receiving device 600 is not receiving signals.

The processing system 614 may be substantially the same as the processing system 614 illustrated in FIG. 6, including a bus interface 608, a bus 602, memory 605, a processor 604, and a computer-readable medium 606. Furthermore, the scheduled entity 600 may include a user interface 612, a transceiver 610, and antennas 611 substantially similar to those described above in FIG. 5. That is, the processor 604, as utilized in a scheduled entity 600, may be configured (e.g., in coordination with the memory 605) to implement any one or more of the processes described below and illustrated in FIGS. 11, 13, and/or 15.

In some aspects of the disclosure, the processor 604 may include communication circuitry 642 configured (e.g., in coordination with the memory 605) for various functions, including, for example, receive and process DM-RS configuration information, receive a PDSCH communication transmitted with mode division multiplexing based on determined transmit powers for one or more OAM modes of the PDSCH communication, receive and process CSI report configuration information, receive a CSI-RS transmitted on an OAM mode, receive data transmitted with mode division multiplexing, receive DM-RS transmitted with mode division multiplexing. For example, the communication circuitry 642 may be configured to implement one or more of the functions described below in relation to FIG. 11, including, e.g., blocks 1125 and/or 1135; and/or in relation to FIG. 15, including, e.g., blocks 1510, 1520, and/or 1530.

In some aspects of the disclosure, the processor 604 may include transceiver controller circuitry 644 configured (e.g., in coordination with the memory 605) for various functions, including, for example, receive and process DM-RS configuration information, receive a PDSCH communication transmitted with mode division multiplexing based on determined transmit powers for one or more OAM modes of the PDSCH communication, receive and process CSI report configuration information, receive a CSI-RS transmitted on an OAM mode, receive data transmitted with mode division multiplexing, receive DM-RS transmitted with mode division multiplexing. For example, the transceiver controller circuitry 644 may be configured to implement one or more of the functions described below in relation to FIG. 11, including, e.g., blocks 1125 and/or 1135; and/or in relation to FIG. 15, including, e.g., blocks 1510, 1520, and/or 1530.

In some aspects of the disclosure, the processor 604 may include power determination circuitry 646 configured (e.g., in coordination with the memory 605) for various functions, including, for example, determining transmit powers for one or more OAM mode including one or more OAM modes with data-data MDM, data-DMRS MDM, and/or DMRS-DMRS MDM. For example, the power determination circuitry 646 may be configured to implement one or more of the functions described below in relation to FIG. 11, including, e.g., blocks 1125 and/or 1135; and/or in relation to FIG. 13, including, e.g., block 1345.

In some aspects of the disclosure, the processor 604 may include CSI determination circuitry 648 configured (e.g., in coordination with the memory 605) for various functions, including, for example, determining a CSI for an OAM mode based on transmit powers for the OAM mode, with and/or without data-DMRS MDM. For example, the CSI determination circuitry 648 may be configured to implement one or more of the functions described below in relation to FIG. 13, including, e.g., blocks 1345 and/or 1350.

And further, the computer-readable storage medium 606 may store computer-executable code that includes communication instructions 652 that configure a receiving device 600 for various functions, including, for example, receive and process DM-RS configuration information, receive a PDSCH communication transmitted with mode division multiplexing based on determined transmit powers for one or more OAM modes of the PDSCH communication, receive and process CSI report configuration information, receive a CSI-RS transmitted on an OAM mode, receive data transmitted with mode division multiplexing, receive DM-RS transmitted with mode division multiplexing. For example, the communication instructions 652 may be configured cause a receiving device 600 to implement one or more of the functions described below in relation to FIG. 11, including, e.g., blocks 1125 and/or 1135; and/or in relation to FIG. 15, including, e.g., blocks 1510, 1520, and/or 1530.

And further, the computer-readable storage medium 606 may store computer-executable code that includes transceiver controller instructions 654 that configure a receiving device 600 for various functions, including, for example, receive and process DM-RS configuration information, receive a PDSCH communication transmitted with mode division multiplexing based on determined transmit powers for one or more OAM modes of the PDSCH communication, receive and process CSI report configuration information, receive a CSI-RS transmitted on an OAM mode, receive data transmitted with mode division multiplexing, receive DM-RS transmitted with mode division multiplexing. For example, the transceiver controller instructions 654 may be configured to cause a receiving device 600 to implement one or more of the functions described below in relation to FIG. 11, including, e.g., blocks 1125 and/or 1135; and/or in relation to FIG. 15, including, e.g., blocks 1510, 1520, and/or 1530.

And further, the computer-readable storage medium 606 may store computer-executable code that includes power determination instructions 656 that configure a receiving device 600 for various functions, including, for example, determining transmit powers for one or more OAM mode including one or more OAM modes with data-data MDM, data-DMRS MDM, and/or DMRS-DMRS MDM. For example, the power determination instructions 656 may be configured to cause a receiving device 600 to implement one or more of the functions described below in relation to FIG. 11, including, e.g., blocks 1125 and/or 1135; and/or in relation to FIG. 13, including, e.g., block 1345.

And further, the computer-readable storage medium 606 may store computer-executable code that includes CSI determination instructions 658 that configure a receiving device 600 for various functions, including, for example, determining a CSI for an OAM mode based on transmit powers for the OAM mode, with and without data-DMRS MDM. For example, the CSI determination instructions 658 may be configured to cause a receiving device 600 to implement one or more of the functions described below in relation to FIG. 13, including, e.g., blocks 1345 and/or 1350.

In one configuration, the receiving device 600 for wireless communication includes means for receiving DMRS configuration information, means for receiving CSI report configuration information, means for receiving PDSCH communications without data-DMRS mode division multiplexing (MDM), means for receiving PDSCH communications with data-DMRS MDM, means for receiving a CSI-RS for an OAM mode with data-DMRS MDM, means for receiving a CSI-RS for an OAM mode without data-DMRS MDM, means for determining transmit powers for one or more OAM modes including one or more OAM modes with data-data MDM, data-DMRS MDM, and/or DMRS-DMRS MDM, means for determining a CSI for an OAM mode based on transmit powers for the OAM mode (with and without data-DMRS MDM), and means for transmitting CSI reports. In one aspect, the aforementioned means may be the processor(s) 604 shown in FIG. 6 configured to perform the functions recited by the aforementioned means. In another aspect, the aforementioned means may be a circuit or any apparatus configured to perform the functions recited by the aforementioned means.

Of course, in the above examples, the circuitry included in the processor 604 is merely provided as an example, and other means for carrying out the described functions may be included within various aspects of the present disclosure, including but not limited to the instructions stored in the computer-readable storage medium 606, or any other suitable apparatus or means described in any one of the FIGS. 1, 2, 3, 11, and/or 13, and utilizing, for example, the processes and/or algorithms described herein in relation to FIGS. 11, 13, and/or 15.

In some aspects, this disclosure provides for a wireless communication technique that exploits an orbital angular momentum (OAM) property of electromagnetic (EM) waves for modulating a carrier to carry information, and/or for multiplexing reference signals onto a common wireless resource. Systems and devices that employ OAM are currently under intense development due to its improved communication spectrum efficiency, its capability to provide high-order spatial multiplexing (e.g., as described further below), potentially resulting in higher data rates, and the possibility to enable low receiver complexity. OAM is regarded as a strong candidate for future 6G communication technology or as an enhancement to existing 5G technology. As one example, OAM may be used for wireless communication between backhaul devices in a network, such as between a base station and an integrated access backhaul (IAB), between two base stations, and/or between two IABs. OAM may be used for wireless communications between other communication devices as well. OAM may provide a line-of-sight (LOS) communication scheme with high spatial multiplexing and low complexity that can be beneficial for communications between such backhaul devices, as well other network devices.

SPP Configuration

Figure 7:
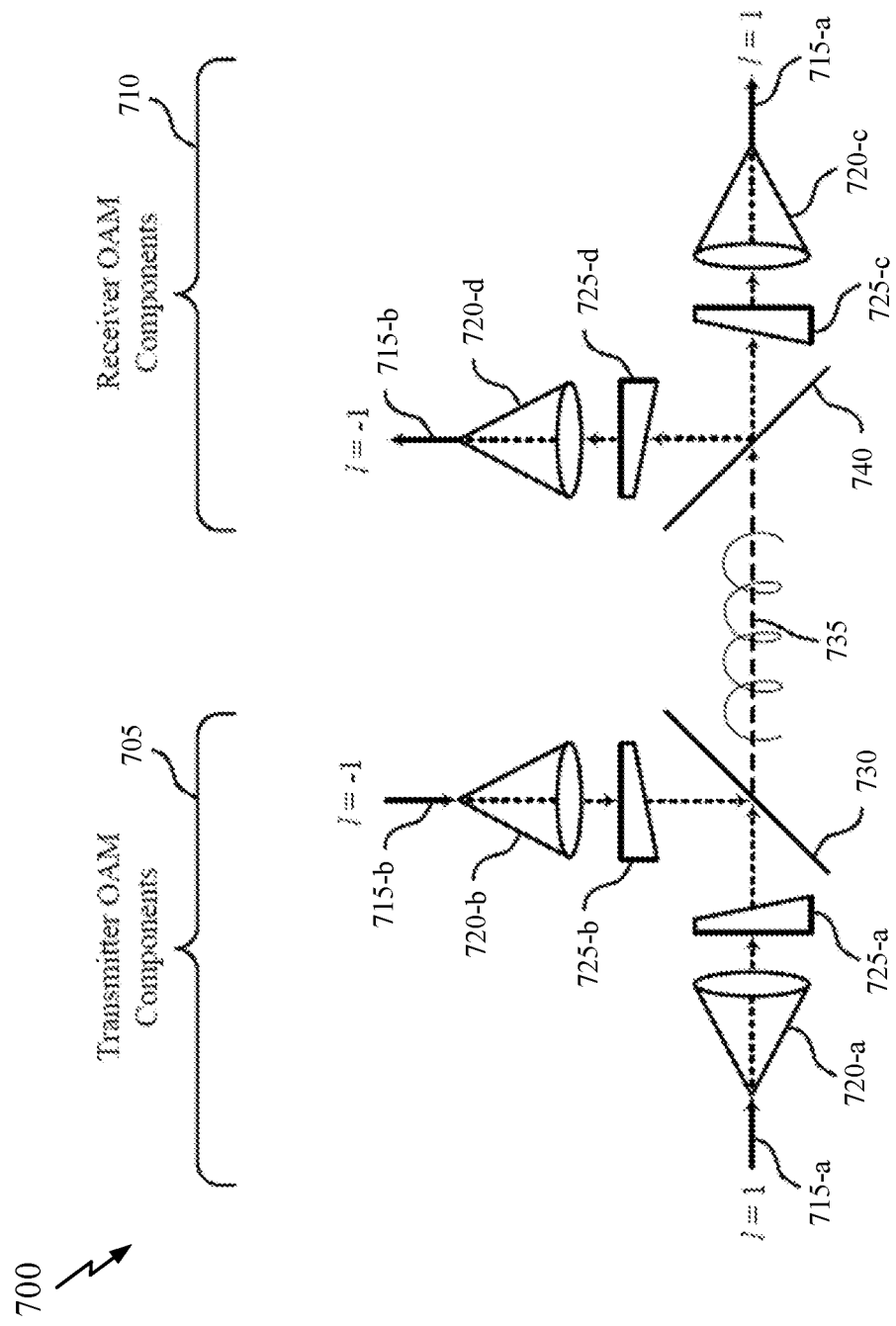
FIG. 7 is a schematic illustration of wireless communication via a spiral phase plate (SPP) configuration that supports the use of orbital angular momentum (OAM) modes for multiplexing communications in accordance with some aspects of this disclosure.

FIG. 7 illustrates an example of a system 700 including a spiral phase plate (SPP) OAM configuration that supports information transmission by OAM mode selection and detection in accordance with some aspects of the present disclosure. In some examples, the illustrated SPP OAM configuration may implement aspects of the wireless communication system 100 and the RAN 200, and may be employed by the transmitting device 302/500 and receiving device 306/600. In this example, a transmitting device (e.g., UE, IAB, or base station) may include transmitter OAM components 705 and a receiving device (e.g., UE, IAB, or base station) may include receiver OAM components 710.

In cases in which wireless devices use an SPP methodology, a transmitting device may convert an EM wave 715-$a$ associated with an OAM mode index l=0 (e.g., a non-helical EM wave associated with mode-zero OAM) into an EM wave associated with an OAM mode index l≠0 (e.g., a helical EM wave associated with a non-zero OAM mode) by passing the EM wave through an aperture 720-$a$ and an SPP 725-$a$. Such an SPP 725-$a$ may have a suitable structure and/or configuration, known to those skilled in the art, such as to generate an EM wave associated with a single OAM mode. For example, the SPP 725-$a$ may be a round plate with a thickness linearly increasing with azimuth angles. The SPP 725-$a$ may further be made of high-density polyethylene (HDPE), for example. Thus, the wireless device may use one SPP 725-$a$ to generate one OAM mode of an OAM beam 735.

The wireless device may include an additional SPP for each additional OAM mode of an OAM beam. For example, in FIG. 7, the system 700 may include an additional SPP on each of the transmitter side and receiver side to support two OAM modes (e.g., l=+1 and −1). More particularly, in the transmitter OAM components 705, in addition to the (first) EM wave 715-$a$ that may be provided to the (first) aperture 720-$a$ and the (first) SPP 725-$a$, a second EM wave 715-$b$ may be provided to a second aperture 720-$b$ and a second SPP 725-$b$. A beam splitter/combiner 730 may combine the output of the first SPP 725-$a$ and the second SPP 725-$b$ to generate OAM beam 735. The receiver OAM components 710 may receive the OAM beam 735 at a beam splitter/combiner 740 to provide instances of the OAM beam 735 to a third SPP 725-$c$ and a fourth SPP 725-$d$ that provide output to a first receiver aperture 720-*c* and a second receiver aperture 720-*d*, respectively. In general, a receiving device includes a separate SPP and receiver aperture for each OAM mode. Thus, the third SPP 725-*c* may be configured recover the OAM mode corresponding to the first SPP 725-*a*, and thus, the output of the first receiver aperture 720-*c* may correspond to the first EM wave 715-*a* (e.g., for OAM Mode l=1). Likewise, the fourth SPP 725-*d* may be configured to recover the OAM mode corresponding to the second SPP 725-*b*, and thus, the output of the second receiver aperture 720-*d* may correspond to the second EM wave 715-*b* (e.g., for OAM Model=−1). In devices that use an SPP methodology, separate SPPs 725-*a* may thus be used for each OAM mode, and the number of SPPs 725 at a device may constrain the number of usable OAM modes. Accordingly, in an embodiment of the system 700 having only one OAM mode, the second aperture 720-*b* and second SPP 725-*b*, the third SPP 725-*d* and the second receiver aperture 720-*d* may not be included. Further, for embodiments of the system 700 including additional OAM modes, additional SPPs and apertures may be provided on each of the transmitter side and receiver side. As described below, wireless devices may also use a UCA methodology for OAM communications, an example of which is discussed with reference to FIG. 8.

UCA Configuration

Figure 8:
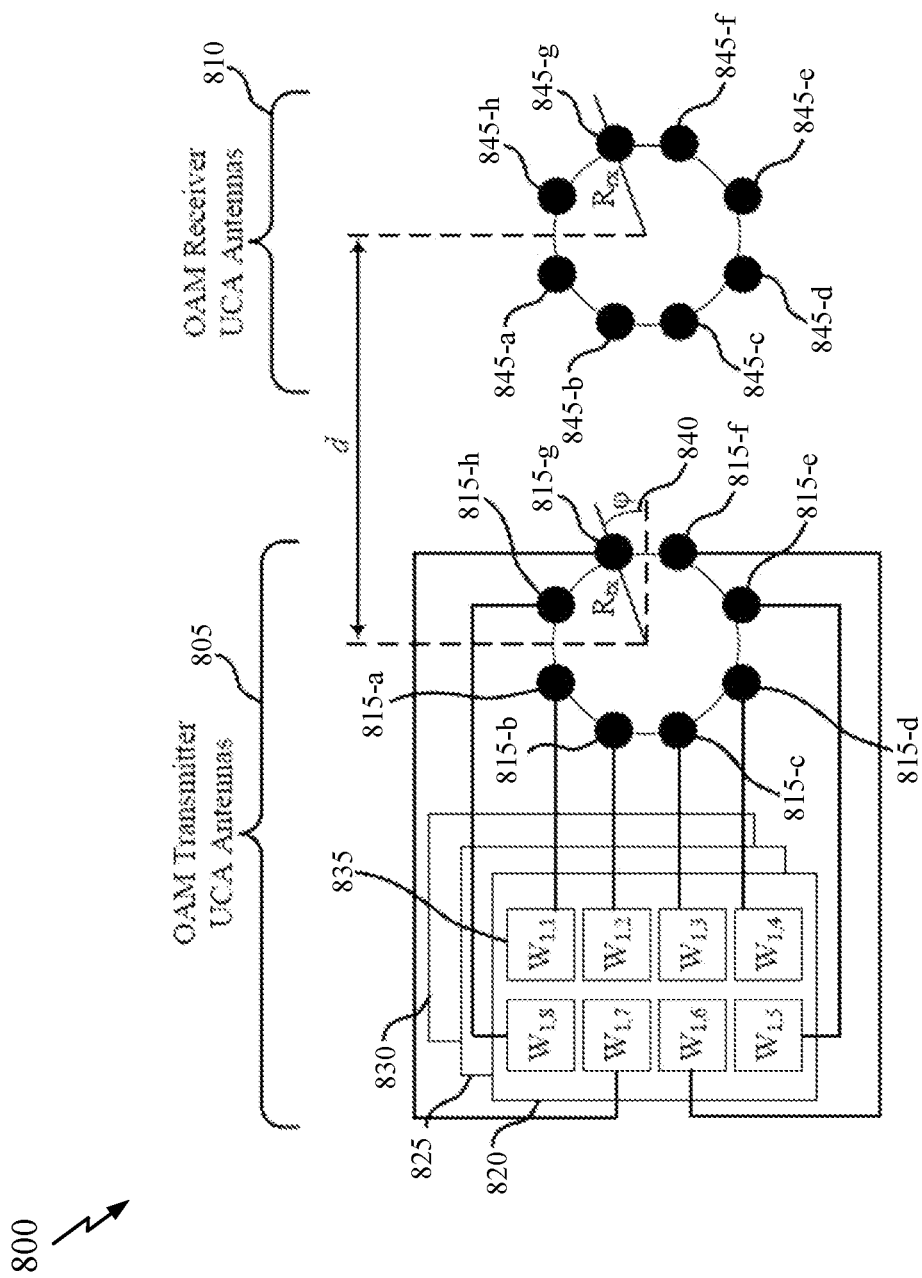
FIG. 8 is a schematic illustration of wireless communication via a uniform circular array (UCA) configuration that supports the use of orbital angular momentum (OAM) modes for multiplexing communications in accordance with some aspects of this disclosure.

FIG. 8 illustrates an example of a system 800 including a uniform circular array (UCA) OAM configuration that supports information transmission by OAM mode selection and detection in accordance with some aspects of the present disclosure. In some examples, the illustrated UCA OAM configuration may implement aspects of the wireless communication system 100 and the RAN 200, and may be employed by the transmitting device 302/500 and receiving device 306/600. In this example, a transmitting device (e.g., UE, IAB, or base station) may include OAM transmitter UCA antennas 805 and a receiving device (e.g., UE, IAB, or base station) may include OAM receiver UCA antennas 810.

In some aspects, one or both of the OAM transmitter UCA antennas 805 or the OAM receiver UCA antennas 810 may be implemented as a planar array of antenna elements, which may be an example of or otherwise function as a (massive or holographic) MIMO array or an intelligent surface. In some cases, the transmitting device may identify a set of antenna elements 815*a*-*h* of the planar array that form a transmitter UCA, and a receiving device may identify a set of antenna elements 845 of the planar array that form a receiver UCA.

Upon selecting the set of antenna elements from the planar array, the OAM transmitter may apply a weight 835 to each of the selected antenna elements 815*a*-*h* based on the OAM mode index l of the transmitted OAM beam and one or more spatial parameters associated with each antenna element. In cases in which a UCA methodology is used to generate an OAM beam, the transmitting device may identify the set of antenna elements 815*a*-*h* on a circular array of antenna elements and may load a first set of weights 820 to each of the identified antenna elements based on a first OAM mode index (e.g., l=0). Further, for other OAM mode indices, other weights may be used for the set of antenna elements 815*a*-*h*, such as a second OAM mode index (e.g., l=+1) that may use a second set of weights 825 and a third OAM mode index (e.g., l=−1) that may use a third set of weights 830.

For example, to generate an OAM beam with a selected OAM mode index (e.g., l=0), an OAM transmitter may load a weight 835 to each antenna element 815*a*-*h* on the UCA based on an angle 840 measured between a reference line on the UCA (e.g., the x-axis of the plane on which the UCA is located, where the origin is at the center of the UCA) and the antenna element, the OAM mode index l, and i (e.g., for complex-valued weights, which may alternatively be denoted as j in some cases). In some cases, for instance, the weight for an antenna element n may be proportional to $e^{il\varphi_n}$, where $\varphi n$ is equal to the angle 840 measured between the reference line on the UCA and the antenna element n. By multiplying respective beamforming weights 835 of each set of weights 820-830 (e.g., for first set of weights 820, w1=[w1,1, w1,2, . . . , w1,8] T) onto each antenna, a signal port may be generated. If the weight 835 of each antenna 815*a*-*h* is equal to $e^{i\varphi l}$, where $\varphi$ is the angle of antenna 815*a*-*h* in the circle (e.g., angle 840 for antenna element 815-*g*), and l is the OAM mode index, then each set of weights 820-830 provides a beamformed port that is equivalent to an OAM mode l. By using different beamforming weights $e^{i\varphi l'}$, where l'≠l, multiple OAM modes are thus generated.

At the OAM receiver UCA antennas 810, the receiving device may have receive antenna elements 845 equipped in a circle. The channel matrix may be denoted from each transmit antenna to each receive antenna as H, and then for the beamformed channel matrix $\tilde{H}$=H [w$_1$, w$_2$, . . . , w$_L$], any two columns of $\tilde{H}$ are orthogonal, which means the beamformed ports have no crosstalk. This may allow OAM-based communication to efficiently realize a high-level spatial multiplexing degree. Further, the eigen-based transmit precoding weights and receive combining weights of UCA-based OAM are equal to a discrete Fourier transform (DFT) matrix, which is independent of communication parameters (e.g., distance, aperture size, and carrier frequency). Thus, UCA-based OAM may be implemented at relatively low cost. In some cases, the receiving device may test multiple different OAM modes to determine the OAM mode that was used in a transmission (e.g., based on whether a particular OAM mode yields a successfully demodulated transmission), which may be used to identify one or more information bits of a transmission.

In some aspects, as described below in connection with FIGS. 7 to 9, when the central axes of the transmitter antennas (e.g., the antennas 511) and receiver antennas (e.g., the antennas 611) are closely aligned (e.g., with less than 0.1 milliradians (mrad) of misalignment), each OAM mode is orthogonal to each other OAM mode. However, as the antennas become misaligned, neighboring OAM modes may cause interference. For example, at 1 mrad of misalignment, an adjacent OAM mode may cause significant interference, and at larger misalignments, OAM modes that are father from a particular OAM mode may also cause interference.

Multiple Coaxial UCA Configuration

Figure 9:
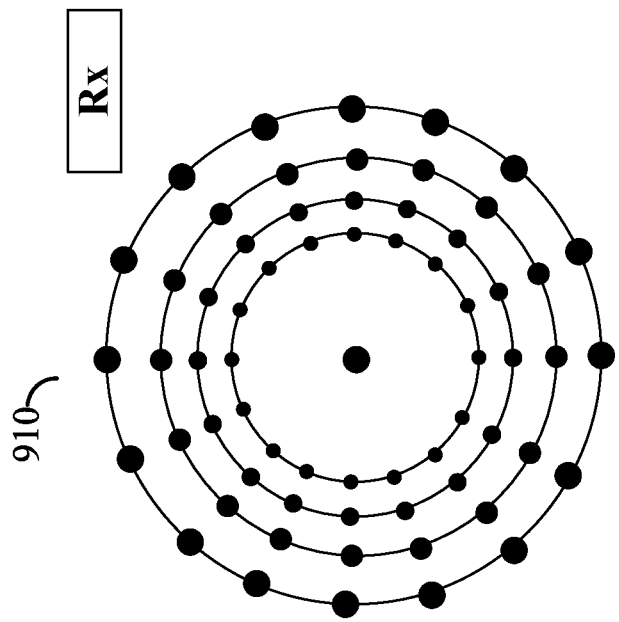
FIG. 9 is a schematic illustration of a coaxial multi-circle OAM configuration that supports two-dimensional index modulation according to some aspects of this disclosure.
Figure 9:
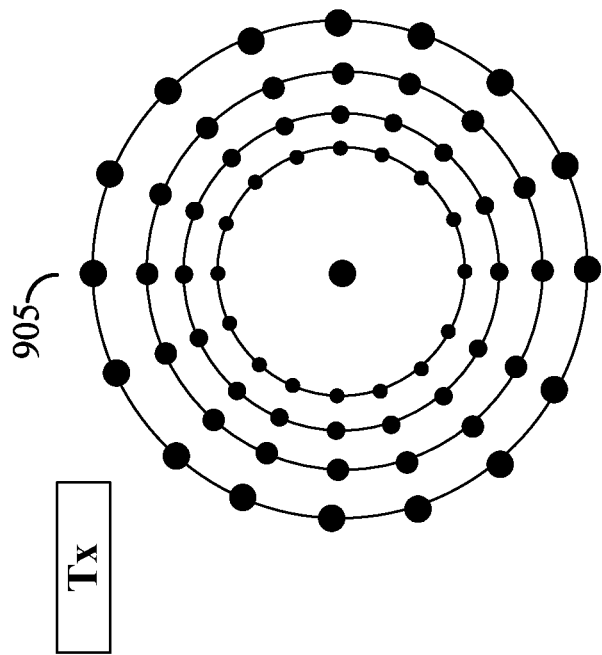

FIG. 9 illustrates an example of a coaxial multi-circle UCA OAM configuration that supports multiplexing and modulating wireless transmissions by controlling OAM modes and coaxial UCA circles in accordance with some aspects of the present disclosure. In some examples, the illustrated coaxial multi-circle UCA OAM configuration may implement aspects of the wireless communication system 100 and RAN 200, and may be employed by the transmitting device 302/500 and receiving device 306/600. In this example, a transmitting device (e.g., UE, IAB, or base station) may include OAM transmitter UCA antennas 905 and a receiving device (e.g., UE, IAB, or base station) may include OAM receiver UCA antennas 910.

In some aspects, one or both of the OAM transmitter coaxial multi-circle UCA antennas 905 or the OAM receiver coaxial multi-circle UCA antennas 910 may be implemented as a planar array of coaxial UCA antenna elements as described above and illustrated in FIG. 8. In various examples, an OAM transmitter may include the same number of UCA circles as an OAM receiver, but this is not necessarily the case. That is, a transmitting device 302/500 can communicate with a receiving device 306/600 with the same number and with a different number of UCA circles.

According to a further aspect of the present disclosure, a transmitting device may employ a subset (e.g., one or more) of its UCA circles from its transmitter UCA antennas 905 for a given transmission. For example, a transmitting device may multiplex a plurality of beams, streams, or waveforms onto a given wireless resource by transmitting each such stream with a different respective set of one or more UCA circles. Theoretically, streams transmitted via different sets of UCA circles can be orthogonal, such that a receiving device can receive and separately recover these streams received over the same radio resource (e.g., overlapping in the time- and frequency-domains, using the same code, etc.).

In a further aspect, a transmitting device may independently select or control an OAM mode for each of the plurality of multiplexed OAM beams. That is, a transmitting device may utilize a first set of one or more UCA circles to transmit a first OAM beam having a first OAM mode, and a second set of one or more UCA circles to transmit a second OAM beam having a second OAM mode. Here, the first OAM mode (i.e., from the first set of one or more UCA circles) may be the same as, or different from the second OAM mode (i.e., from the second set of one or more UCA circles). Various options and further details of such a system are provided in the discussion that follows.

Generally, intra-circle OAM beams with different modes are orthogonal, as explained with respect to the UCA configuration of FIG. 8. For example, a first OAM beam with OAM index l=+1 transmitted by a first circle of the OAM transmitter UCA antennas 905 is orthogonal to a second OAM beam with OAM index l=−1 transmitted by the (same) first circle of the OAM transmitter UCA antennas 905. Generally, inter-circle OAM beams with different OAM modes are also orthogonal. For example, a first OAM beam with OAM index l=+1 transmitted by a first circle of the OAM transmitter UCA antennas 905 is orthogonal to a second OAM beam with OAM index l=−1 transmitted by a second (different) circle of the OAM transmitter UCA antennas 905. Generally, inter-circle OAM beams with the same OAM mode are non-orthogonal. For example, a first OAM beam with OAM index l=+1 transmitted by a first circle of the OAM transmitter UCA antennas 905 is nonorthogonal to a second OAM beam with (same) OAM index (=+1 transmitted by a second (different) circle of the OAM transmitter UCA antennas 905. These nonorthogonal beams may lead to interference between the first and second OAM beams; however, such interference may be at acceptable levels and may not prevent such inter-circle OAM beams with the same OAM mode from being used.

In the description that follows, for ease of description, reference is made to a UCA configuration such as the ones illustrated in FIGS. 8 and 9. However, it is to be understood that the present disclosure is not limited thereto. That is, according to another aspect of this disclosure, reference signal multiplexing using multiple OAM modes may be implemented utilizing an SPP configuration as described above and illustrated in FIG. 7. Additionally, according to other aspects of this disclosure, reference signal multiplexing using multiple OAM modes may be implemented using any structures that enable OAM multiplexing of electromagnetic signals (e.g., RF signals, light signals, etc.) may apply, including but not limited to UCA antennas and SPP antennas, which are described as examples. Signals transmitted (e.g., multiplexed) using multiple OAM modes may be transmitted and/or received using any suitable transmitting components and/or receiving components, which may include or otherwise be configured using any suitably configured phase plates, spatial modulators, integrated circuits, any other suitable components, and/or any suitable combination thereof, for transmission over any suitable medium including a wireless air interface, an optical fiber, etc.

Figure 10A:
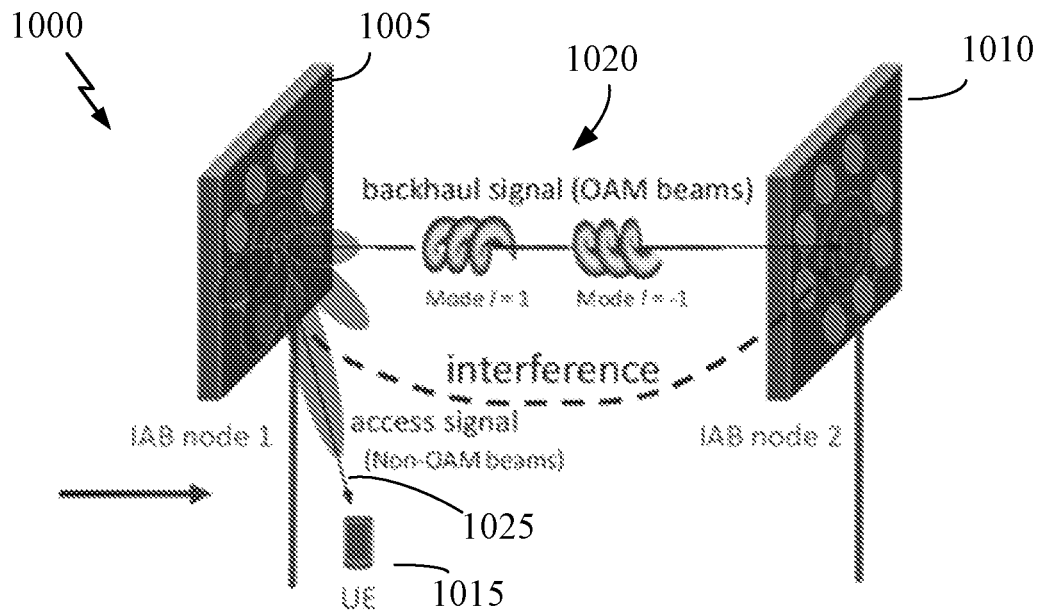
FIG. 10A is diagram of a communication system using OAM communications and experience interference according to some aspects of this disclosure.
Figure 10B:
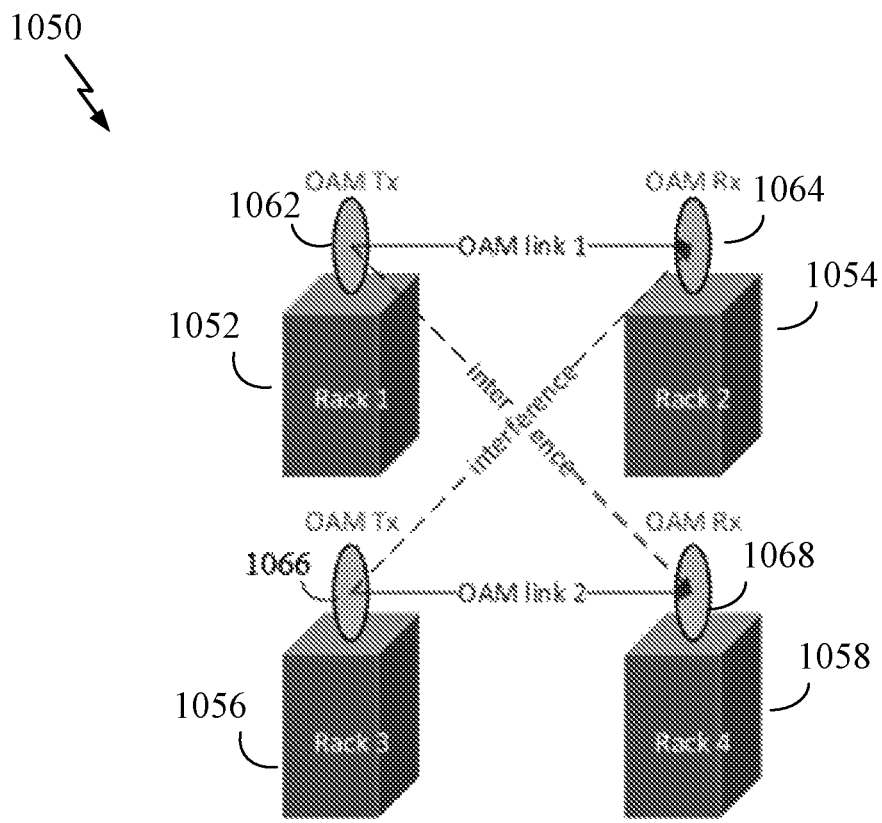
FIG. 10B is diagram of another communication system using OAM communications and experience interference according to some aspects of this disclosure.

FIGS. 10A and 10B are diagrams of respective communication systems 1000 and 1050 that utilize OAM communications and experience interference. In FIG. 10A, the communication system 1000 includes a transmitter 1005 (e.g., an IAB node, relay node, RRH, base station, etc.) and a receiver 1010 (e.g., another IAB node, relay node, RRH, base station, etc.). In some examples, the transmitter 1005 is an example of the transmitter 500 of FIG. 5, and the receiver 1010 is an example of the receiver 600 of FIG. 6. To utilize OAM communications, the transmitter 1005 and the receiver 1010 may include a UCA configuration or SPP configuration, as described above with respect to FIGS. 7, 8, and 9. Although the system 1000 may be generally described in the context of the transmitter 1005 transmitting signals to the receiver 1010, in some examples, the transmitter 1005 and receiver 1010 may bidirectionally communicate such that the receiver 1010 may also transmit signals to the transmitter 1005.

In the diagram, the transmitter 1005 is communicating with the receiver 1010 by transmitting one or more OAM beams 1020, such as a first OAM beam having mode index l=1 and a second OAM beam having mode index l=−1. Additionally, the transmitter 1005 is communicating with a user equipment (UE) 1015 using a non-OAM wireless communication beam 1025. Here, the communications with the UE 1015 may interfere with the OAM communications between the transmitter 1005 and the receiver 1010. Further, this interference may vary as the traffic level of communications between the transmitter 1005 and the UE 1015 vary, and also as the UE 1015 may move with respect to the transmitter 1005.

In FIG. 10B, the communication system 1050 includes four communication racks or cabinets 1052, 1054, 1056, and 1058 that communicate using OAM beams. More particularly, a first rack 1052 includes a transmitter 1062 that transmits OAM beams to a receiver 1064 of a second rack 1054, and a third rack 1056 includes a transmitter 1066 that transmits OAM beams to a receiver 1068 of a fourth rack 1058. In some examples, the transmitters 1062 and 1066 are examples of the transmitter 500 of FIG. 5, and the receivers 1064 and 1068 are examples of the receiver 600 of FIG. 6. To utilize OAM communications, the transmitters 1062 and 1066 and the receivers 1064 and 1068 may include a UCA configuration or SPP configuration, as described above with respect to FIGS. 7, 8, and 9. Although the system 1050 may be generally described in the context of the transmitters 1062 and 1066 transmitting signals to the receivers 1064 and 1068, in some examples, the transmitters 1062 and 1066 and receivers 1064 and 1068 may bidirectionally communicate such that the receivers 1064 and 1068 may also transmit signals to the transmitters 1062 and 1066.

In the diagram of FIG. 10B, the transmitter 1062 is communicating with the receiver 1064 by transmitting one or more OAM beams, such as a first OAM beam having mode index l=1 and a second OAM beam having mode index l=−1. Additionally, the transmitter 1066 is communicating with the receiver 1068 by transmitting one or more OAM beams, such as a first OAM beam having mode index l=1 and a second OAM beam having mode index l=−1. Here, the communications between the transmitter 1062 of the first rack 1052 and the receiver 1064 of the second rack 1054 may interfere with the communications between the transmitter 1066 of the third rack 1056 and the receiver 1068 of the fourth rack 1058, and vice-versa. Further, this interference may vary as the traffic level of communications between the transmitters 1062 and 1066 and the receivers 1064 and 1068 varies.

To account for the varying interference, communication systems such as the systems 1000 and 1050 may periodically transmit reference signals and measure the reference signals upon their receipt to estimate the interference at a particular time. For example, the transmitters of these systems 1000 and 1050 may periodically transmit a demodulation reference signal (DM-RS), which the corresponding receivers of these systems 1000 and 1050 may receive and measure to estimate channel performance including an estimate of interference on the channel. Upon determining the interference, the transmitters and receivers may alter communication parameters (e.g., transmission power levels, selected OAM mode, selected UCA antenna circle, etc.) to reduce the impact of interface on the communications.

Typically, a transmitter may transmit a DM-RS and data signal using time-division multiplexing (TDM) or frequency division multiplexing (FDM). However, transmitters may not transmit DM-RS and data signals using spatial division multiplexing (SDM) because the non-orthogonality between the spatially multiplexed DM-RS and data signals could impair the channel estimation performance. For example, in an SDM communication, the received signal y=H (x+s)+n, where x is the data symbol, s is the DM-RS symbol, His an estimated equivalent channel matrix for the SDM communication channel, and n represents noise. Because the data symbol (x) is an unknown to the receiver, the estimation of H is difficult. For at least this reason, communication systems may not transmit DM-RS and data signals using the same time and frequency resources, even with typical spatial division multiplexing of the DM-RS and data signals.

In some aspects, this disclosure provides wireless communication systems that transmit reference signals (e.g., a DM-RS) and data signals using mode division multiplexing (MDM) in OAM communications. In other words, in an OAM communication link, a transmitter may spatially-division multiplex data and a DM-RS using different OAM modes, thereby transmitting data and DM-RS using the same time and frequency resources. For example, a transmitter may transmit a data signal on a first OAM mode index and a DM-RS on a second OAM mode index that use the same time and frequency resources. For example, the transmitter may transmit a first OFDM symbol carrying data on a first OAM mode and a second OFDM symbol carrying a DM-RS on a second OAM mode, where the first and second OFDM symbols are transmitted at overlapping times (e.g., at the same time) and over overlapping subcarriers (e.g., over the same subcarriers). Because OAM beams of different mode indexes are substantially orthogonal, the data signal transmitted on a first OAM mode index may not substantially interfere with a data signal on a second OAM mode index, and vice-versa.

Additionally, communications using different OAM mode indexes have shown different levels of resistance to interference. That is, lower order OAM mode indexes are generally less resistant to interference than higher order OAM mode indexes. For example, an OAM beam having a mode index of l=1 or −1 is generally less resistant to interference than an OAM beam having a mode index of l=2 or −2. To account for the increased susceptibility to interference, in some aspects, a transmitter may transmit a DM-RS more often for an OAM communication channel having a first (lower) mode index l than for an OAM communication channel having a second (higher) mode index l, where the second mode index is higher than the first mode index. Thus, in some aspects, how frequently a transmitter transmits a reference signal (e.g., a DM-RS) for an OAM communication channel may be based on the OAM mode index associated with that channel.

Mode-Division Multiplexing Reference and Data Signals

FIG. 11 is a diagram 1100 illustrating an exemplary process for mode-division multiplexing a reference signal and data signal on shared time and frequency resources using different OAM modes in accordance with some aspects of this disclosure. As described below, some or all illustrated features may be omitted in a particular implementation within the scope of the present disclosure, and some illustrated features may not be required for implementation of all embodiments. FIG. 11 is described with respect to an OAM transmitter 1105 and an OAM receiver 1110. In some examples, the OAM transmitter 1105 is an example of the transmitting device 500 illustrated in FIG. 5 and the OAM receiver 1110 is an example of the receiving device 600 illustrated in FIG. 6. In some examples, the process of FIG. 11 may be carried out by any suitable apparatus or means for carrying out the functions or algorithm described below.

At block 1112, the OAM transmitter 1105 transmits demodulation reference signal (DM-RS) configuration information 1115. The DM-RS configuration information 1115 may include DM-RS radio resource related parameters and power allocation related parameters. The DM-RS radio resource related parameters may include a mode-specific time-frequency resource allocation for a DM-RS of each OAM mode. In some examples, the time-frequency resources allocation may be expressed in terms of resource elements (REs) or subcarriers (for frequency) and symbols (for time), although other units may also be used in other examples. For example, this allocation may indicate the periodicity in the time domain and/or frequency domain of DM-RSs for each OAM mode. Power allocation related parameters may include transmit (Tx) power ratio for each OAM mode relative to one or more (or all) other OAM modes used by the transmitter 1105 and receiver 1110. In an example with two OAM modes used for mode-division multiplexing, the power allocation related parameters may include a transmit power ratio of a DM-RS symbol (e.g., an OFDM symbol carrying a DM-RS) of the first OAM mode over the data symbol (e.g., a OFDM symbol carrying data or information) of the second OAM mode. In another example, the transmit power ratio may indicate the ratio of total transmit power of DM-RS symbols with a first set of OAM modes over the total transmit power of data symbols with a second set of OAM modes. Use of the transmit power ratio to determine transmit power levels is described in further detail below.

Accordingly, the DM-RS configuration information 1115 may indicate to the OAM receiver 1110 when (e.g., which symbols) to expect reception of a communication with data and DM-RS mode-division multiplexed, the frequencies (e.g., which subcarriers or resource elements (REs)) that may be used to carry the data and DM-RS for each OAM mode (e.g., which, and the transmit power ratio of the data and DM-RS. For example, the OAM receiver 1110 may analyze the mode-specific time-frequency resource allocation for each OAM mode and determine when DM-RS symbols for a first mode will be transmitted at the same time and frequency as the data symbol for a second mode. In some examples, the DM-RS configuration information 1115 may also indicate to the OAM receiver 1110 when to expect DM-RSs to be mode-division multiplexed on different OAM modes, as well as the frequencies that may be used to carry the mode-division multiplexed DM-RSs, and the transmit power ratio of the mode-division multiplexed DM-RSs. In some examples, the DM-RS configuration information 1115 may also indicate to the OAM receiver 1110 when to expect no DM-RSs to be mode-division multiplexed (e.g., when the OAM transmitter 1105 transmits mode-division multiplexed data on both or all OAM modes).

As one example, for illustration, the transmitter 1105 and receiver 1110 may be configured to communicate using mode-division multiplexing with two OAM modes: OAM mode 1 and OAM mode 2, where OAM mode 2 has a higher mode index than OAM mode 1. In this example, the DM-RS configuration information may indicate that a DM-RS should be transmitted every four symbols for OAM mode I (e.g., at symbol #1, #5, #9, #13, #17, etc.), and every eight symbols for OAM mode 2 (e.g., at symbol #1, #9, #17, etc.). Thus, in this example, the DM-RS periodicity for OAM mode I is half the DM-RS periodicity for OAM mode 2. This example configuration is illustrated in a timing diagram of FIG. 12, which is described in further detail below. The DM-RS periodicity for OAM mode 1 may be configured to be less than that for OAM mode 2 because the OAM mode 2 has a higher mode index than OAM mode 1 and, as noted above, may be less susceptible to interference. The DM-RS configuration information may further indicate the transmit power ratio for the OAM mode I relative to the OAM mode 2 at times when data and DM-RS symbols will be transmitted using mode-division multiplexing (e.g., at symbol #5, #13, etc.).

In some examples, upon receipt to the DM-RS configuration information, the OAM receiver 1110 processes the configuration information to determine the various information noted above that may be indicated by the DM-RS configuration information (e.g., the timing information, the frequency information, and the transmit power ratios for DM-RS and data).

The OAM transmitter 1105 may transmit the DM-RS configuration information 1115 to the OAM receiver 1110 via radio resource control (RRC) signaling, medium access control (MAC) control element (CE) signaling, or via other communication layers. In some aspects, the OAM transmitter 1105 may transmit the DM-RS configuration information 1115 using any suitable communication interface, such as a transceiver (e.g., the transceiver 510) and antenna(s) (e.g., the antennas 511). In some examples, the OAM receiver 1110 may receive the DM-RS configuration information from a source other than the OAM transmitter 1105, such as a central controller.

In block 1118, the OAM transmitter 1105 transmits a physical downlink shared channel (PDSCH) communication 1120 over multiple OAM modes, but where the PDSCH does not include mode-division multiplexed (MDM) data and a DM-RS. For example, for a given symbol or symbols, the OAM transmitter 1105 transmits data on each OAM mode used for the PDSCH communication (i.e., mode-division multiplexing data signals), or transmits a DM-RS on each OAM mode used for the PDSCH communication (i.e., mode-division multiplexing DM-RSs). Here, data generally refers to information and signals, other than a DM-RS. In some examples, the data may include other (non-DM-RS) reference signals, such as a channel state information reference signal (CSI-RS), and/or other downlink data.

Figure 12:
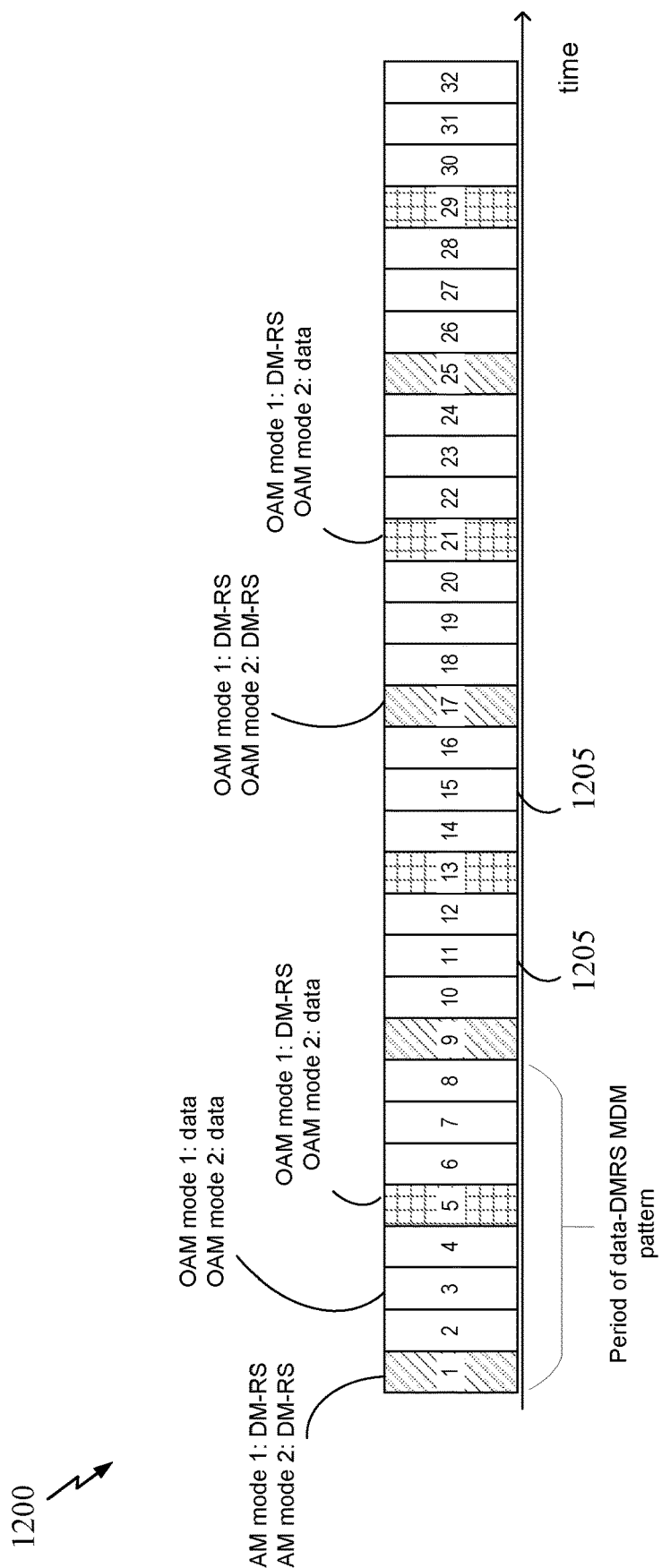
FIG. 12 is a timing diagram illustrating example communications that use mode-division multiplexing in accordance with some aspects of this disclosure.

Turning momentarily to FIG. 12, a timing diagram 1200 illustrates an example of communications that use mode-division multiplexing. The timing diagram 1200 illustrates a set of shared time and frequency resources used by a transmitter and receiver (e.g., the transmitter 1105 and receiver 1110 of FIG. 11) to communicate using mode-division multiplexing. The timing diagram 1200 is divided into units 1205, with each unit 1205 associated with shared time and frequency resources for transmission of two or more symbols using mode-division multiplexing. In other words, at each unit 1205, the transmitter may transmit two or more symbols using the same time and frequency resources, but each symbol may be associated with a unique OAM mode. For illustration purposes, the diagram 1200 illustrates mode-division multiplexing using two OAM modes: OAM mode 1 and OAM mode 2. Each unit 1205 may correspond to two symbols transmitted by the transmitter: a first symbol for the OAM mode 1 and a second symbol for the OAM mode 2. However, in some examples, the transmitter may communicate using mode-division multiplexing with more than two modes and, accordingly, each unit 1205 may be associated with more than two symbols.

In the timing diagram of FIG. 12, each of the units 1205 includes a unique symbol identifier #1-32. The symbol identifier # references the symbol of each OAM mode that is mode-division multiplexed in that unit 1205. For example, symbol identifier #1 refers to symbol #1 for OAM mode 1 and symbol #1 for OAM mode 2.

In the timing diagram of FIG. 12, symbol identifiers #1, #2, #3, #4, #6, #7, #8, etc. may correspond to a communication, such as the PDSCH communication 1120 of FIG. 11, from the transmitter in which the transmitter does not communicate data and DM-RS symbols using mode-division multiplexing. For example, at symbol identifier #1, the transmitter transmits a respective DM-RS symbol on each of the OAM mode 1 and OAM mode 2. Additionally, at symbol identifiers #2, #3, #4, #6, #7, #8, the transmitter transmits a respective data symbol on each of the OAM mode 1 and OAM mode 2.

Returning to FIG. 11, in block 1125, the OAM receiver 1110 receives the PDSCH communication 1120 based on determining the transmit power without the existence of data-DMRS mode division multiplexing. In other words, in block 1125, the OAM receiver 1110 determines the transmit power for each mode of the mode-division-multiplexed communication 1120 using a power determination technique associated with a transmission that does not include data-DMRS mode division multiplexing. Additionally, the OAM receiver 1110 may then use determined transmit power to process the content of the PDSCH communication 1120 (e.g., to perform channel estimation with received reference signals or demodulation for received data).

In a first example, the OAM transmitter 1105 transmits a data symbol on each OAM mode of the PDSCH communication 1120 (see, e.g., symbol #2 of FIG. 12). In this example, the OAM transmitter 1105 may be presumed to allocate transmit power evenly across each OAM mode. In this example, the transmit power for each data symbol may be calculated as:

$$P_{data} = \frac{P_{tx}}{N + M}$$

where $P_{tx}$ is the total transmit power of all multiplexed OAM modes, N is the number of multiplexed OAM modes where data symbols are transmitted, and M is the number of multiplexed OAM modes where DM-RS symbols are transmitted (M=0 in this case). The OAM receiver 1110 may then use $P_{data}$ to perform data demodulation for each OAM mode whose data symbol was received. After determining $P_{data}$, the OAM receiver 1110 may use standard data demodulation techniques to demodulate the data symbols of the PDSCH communication 1120.

In a second example, the OAM transmitter 1105 transmits a DM-RS symbol on each OAM mode of the PDSCH communication 1120 (see, e.g., symbol #1 of FIG. 12). In this example, the OAM transmitter 110 may be presumed to allocate transmit power evenly across each OAM mode. In this example, the transmit power for each DM-RS symbol may be calculated as:

$$P_{DMRS} = \frac{P_{tx}}{N+M}$$

where $P_{tx}$ is the total transmit power of all multiplexed OAM modes, N is the number of multiplexed OAM modes where data symbols are transmitted (N=0 in this case), and M is the number of multiplexed OAM modes where DM-RS symbols are transmitted. The OAM receiver 1110 may then use $P_{DMRS}$ to perform channel estimation for each OAM mode whose DM-RS symbol was received. After determining $P_{DMRS}$, the OAM receiver 1110 may use standard channel estimation techniques for each OAM mode.

In block 1128, the OAM transmitter 1105 transmits a PDSCH communication 1130 with data and a DM-RS being mode-division multiplexed. For example, for a given symbol or symbols, the OAM transmitter 1105 transmits data on at least one OAM mode used for the PDSCH communication 1130, and transmits a DM-RS on at least one other OAM mode used for the PDSCH communication 130. Thus, the transmitter may transmit the DM-RS and the data using the same time and frequency resources using mode-division multiplexing. In the timing diagram of FIG. 12, symbol identifiers #5, #13, #21, etc. may correspond to a communication, such as the PDSCH communication 1130 of FIG. 11, from the transmitter in which the transmitter communicates data and DM-RS symbols using mode-division multiplexing. For example, at symbol identifier #5, the transmitter transmits a DM-RS symbol on the OAM mode I and a data symbol on the OAM mode 2.

Returning to FIG. 11, in block 1135, the OAM receiver 1110 receives the PDSCH communication 1130 based on determining the transmit power with the existence of data-DMRS mode division multiplexing. In other words, the OAM receiver 1110 determines the transmit power for each mode of the mode-division-multiplexed communication 1130 using a power determination technique associated with a transmission that includes data-DMRS mode division multiplexing. Additionally, the OAM receiver 1110 may then use the determined transmit power to process the content of the PDSCH communication 1130 (e.g., to perform channel estimation with received reference signals and demodulation for received data).

The OAM receiver 1110 may calculate the transmit power for data and DM-RS symbols of the PDSCH communication 1130 using various techniques, two of which are provided below. In the two examples that follow, the OAM transmitter 1105 may be presumed to allocate transmit power evenly across each OAM mode used for DM-RS and to allocate transmit power evenly across each OAM mode used for data. However, in other examples, the transmit power may not be evenly allocated. As noted above, the DM-RS configuration information may indicate an inter-mode transmit power ratio ($\gamma$) for DM-RS symbol(s) over data symbol(s) in the mode-division-multiplexed PDSCH communication 1130. Generally, in a system that prioritized transmit power of DM-RS over data symbols, the transmit power ratio $\gamma > 1$; and, in a system that prioritizes transmit power of data over DM-RS symbols, the transmit power ratio $\gamma < 1$.

In a first example ("option 1"), the inter-mode transmit power ratio (y) may be defined as the ratio of the transmit power of one DM-RS symbol with a first OAM mode over the transmit power of one data symbol with a second OAM mode. In this case, the receiver 1110 may calculate the transmit power for each DM-RS symbol ($P_{DMRS}$) using:

$$P_{DMRS} = \frac{\gamma P_{tx}}{N + \gamma M}$$

and may calculate the transmit power for each data symbol ($P_{data}$) using:

$$P_{data} = \frac{P_{tx}}{N + \gamma M}$$

where $P_{tx}$ is the total transmit power of all multiplexed OAM modes, N is the number of multiplexed OAM modes where data symbols are transmitted, and M is the number of multiplexed OAM modes where DM-RS symbols are transmitted. In the case of the communication 1130, N and M are both non-zero integers.

In a second example ("option 2"), the inter-mode transmit power ratio (y) may be defined as the ratio of the total transmit power of DM-RS symbol(s) with a first set of one or more OAM modes (e.g., one DM-RS symbol per OAM mode of the first set) over the total transmit power of data symbol(s) with a second set of one or more OAM mode (e.g., one data symbol per OAM mode of the second set). In this case, the receiver 1110 may calculate the transmit power for each DM-RS symbol ($P_{DMRS}$) using:

$$P_{DMRS} = \frac{\gamma P_{tx}}{(1 + \gamma) M}$$

and may calculate the transmit power for each data symbol ($P_{data}$) using:

$$P_{data} = \frac{P_{tx}}{(1 + \gamma) N}$$

where $P_{tx}$ is the total transmit power of all multiplexed OAM modes, N is the number of multiplexed OAM modes where data symbols are transmitted, and M is the number of multiplexed OAM modes where DM-RS symbols are transmitted. In the case of the communication 1130, N and M are both non-zero integers.

Regardless of the calculation technique, after determining $P_{data}$, the OAM receiver 1110 may then use $P_{data}$ to perform data demodulation for each OAM mode whose data symbol was received. After determining $P_{data}$, the OAM receiver 1110 may use standard data demodulation techniques to demodulate the data symbols of the PDSCH communication 1130. Similarly, regardless of the calculation technique, after determining $P_{DMRS}$, the OAM receiver 1110 may then use $P_{DMRS}$ to perform channel estimation for each OAM mode whose DM-RS symbol was received. After determining $P_{DMRS}$, the OAM receiver 1110 may use standard channel estimation techniques for each OAM mode.

Although the diagram 1100 is described with respect to a DM-RS and the physical downlink shared channel, in some examples, the OAM transmitter 1105 transmits a different type of reference signal to the receiver 1110 and/or employs a different communication channel for one or more of the communications 1120 or 1130.

FIG. 13 is a diagram 1300 illustrating an exemplary process for channel state estimation and reporting on a channel with mode-division multiplexing of a reference signal and data signal on shared time and frequency resources using different OAM modes in accordance with some aspects of this disclosure. As described below, some or all illustrated features may be omitted in a particular implementation within the scope of the present disclosure, and some illustrated features may not be required for implementation of all embodiments. FIG. 13 is described with respect to an OAM transmitter 1305 and an OAM receiver 1310. In some examples, the OAM transmitter 1305 is an example of the transmitting device 500 illustrated in FIG. 5 and/or the OAM transmitter 1105 of FIG. 11, and the OAM receiver 1310 is an example of the receiving device 600 illustrated in FIG. 6 and/or the OAM receiver 1110 of FIG. 11. In some examples, the process of FIG. 13 may be carried out by any suitable apparatus or means for carrying out the functions or algorithm described below.

At block 1315, the OAM transmitter 1305 transmits demodulation reference signals (DM-RS) configuration information 1320. The DM-RS configuration information 1320 may include DM-RS radio resource related parameters and power allocation related parameters. Block 1315 may be implemented by the OAM transmitter 1305 in a similar manner as the OAM transmitter 1105 implements block 1112 of FIG. 11 described above. Accordingly, the description of block 1112 above similarly applies to block 1315 and, for brevity, is not repeated.

Additionally, similar to block 1112, in some examples, upon receipt of the DM-RS configuration information 1320, the OAM receiver 1310 processes the information to determine the various information noted above that may be indicated by the DM-RS configuration information (e.g., the timing information, the frequency information, and the transmit power ratios for DM-RS and data).

In block 1325, the OAM transmitter 1305 transmits channel state information (CSI) configuration information 1330. The CSI configuration information 1330 configures the OAM receiver 1310 for generating a first CSI report for a communication including mode division multiplexing data with other data (data-data MDM) and for generating a second CSI report for a communication including mode division multiplexing data with DM-RS (data-DMRS MDM). For configuring each of the first and second CSI reports, the CSI configuration information 1330 may indicate, for example, one or more of a scheduling or timing for the CSI reports, parameters to be measured, reporting granularity in the frequency domain, whether to restrict channel measurement in the time domain, whether to restrict interference measurement in the time domain, and parameters for type 1 and type 2 codebooks.

In block 1335, the OAM transmitter 1305 transmits a channel state information reference signal (CSI-RS) 1340 for OAM mode i, where i may identify any one of a plurality of OAM modes that the transmitter 1305 is using to communicate with the OAM receiver 1310. For example, in the case of the OAM transmitter 1305 transmitting over two OAM modes (OAM mode I and OAM mode 2), the OAM mode i may refer to OAM mode 1 or, in another instance, OAM mode 2. As will become apparent, the process of the diagram 1300 may be repeated (in parallel or sequentially) for each OAM mode of a plurality of OAM modes used by the OAM transmitter 1305 to communicate with the OAM receiver 1310. For example, in the case of two OAM modes (OAM mode I and OAM mode 2), the process of the diagram 1300 may be executed with respect to the first OAM mode 1 and then again for the OAM mode 2.

In some examples, the OAM transmitter 1305 may transmit the CSI-RS 1340 for the OAM mode i and (a) simultaneously transmit data on another OAM mode using mode division multiplexing, (b) simultaneously transmit a DM-RS on another OAM mode using mode division multiplexing, (c) simultaneously transmit a CSI-RS on another OAM mode using mode division multiplexing, or (d) may transmit nothing on the other OAM mode(s). The mode-division multiplexed communication, including the CSI-RS 1340 on the OAM mode i and data, a DM-RS, or CSI-RS on another OAM mode, may be referred to as the multiplexed CSI communication. As an example, with reference back to FIG. 12, the OAM transmitter 1305 may transmit the CSI-RS 1340 on OAM mode 2 at symbol identifier #2 (i.e., as the data of the symbol #2 for OAM mode 2). In this example, the CS-RS 1340 is mode-division multiplexed with data or another CSI-RS on OAM mode 1. In another example, the transmitter 1305 may transmit the CS-RS 1340 on OAM mode 2 at symbol identifier #5 (i.e., as the data of the symbol #5 for OAM mode 2). In this example, the CSI-RS 1340 is mode-division multiplexed with a DM-RS on OAM mode 1. The symbol identifiers #2 and #5 were selected merely illustration, as the transmitter 1305 may transmit the CSI-RS 1340 as part of any other data symbol in the diagram 1200.

Returning to FIG. 13, in block 1345, the OAM receiver 1310 may determine channel state information (CSI) for OAM mode i based on a transmit power for the CSI communication that includes the CSI-RS 1340. For example, to determine the CSI for OAM mode i, the OAM receiver 1310 may estimate an equivalent channel matrix for OAM mode i, denoted as $\tilde{H}_i$, based on the received CSI-RS 1340 for each of a data communication on OAM mode i and for a DM-RS communication on OAM mode i. In the case of the OAM transmitter 1305 transmitting the CSI-RS 1340 to estimate the channel for data in a data-DMRS MDM communication, the OAM receiver 1310 may determine the equivalent channel matrix ($\tilde{H}_i$) for data using the following equation:

$$\tilde{H}_i = H_i \cdot \frac{P_{data}}{P_{CSJ-RS}} = H_i \cdot \frac{P_{tx}}{P_{CSJ-RS} \cdot (N + \gamma M)}.$$

$P_{CSI-RS}$ is the transmission power of the CS-RS 1140, which may be configured by the OAM transmitter 1305 in an earlier communication (e.g., the OAM transmitter 1305 may communicate the value of $P_{CSI-RS}$ to the OA receiver 1310). In the case of the OAM transmitter 1305 transmitting the CSI-RS 1340 to estimate the channel for a DM-RS in a data-DMRS MDM communication, the OAM receiver 1310 may determine the equivalent channel matrix ($\tilde{H}_i$) for DM-RS using the following equation:

$$\tilde{H}_i = H_i \cdot \frac{P_{DMRS}}{P_{CSJ-RS}} = H_i \cdot \frac{\gamma P_{tx}}{P_{CSJ-RS} \cdot (N + \gamma M)}.$$

As can be seen, $P_{DMRS}$ may be determined using similar techniques and equations as used in block 1135 of FIG. 11.

In block 1350, the OAM receiver 1310 may transmit a CSI report 1355 for the OAM mode i to the OAM transmitter 1305. For example, the OAM receiver 1310 may determine CSI, including a rank indicator (RI), a precoding matrix indicator (PMI), and/or channel quality information (CQI), for the OAM mode i and provide the CSI in the CSI report 1355 to the OAM transmitter 1305.

In some examples, in blocks 1345 and 1350, the OAM receiver 1310 determines the CSI and transmits the CSI report for OAM mode i for both a communication with data-DMRS MDM and a communication without data-DMRS MDM (a joint CSI report) based on a single CSI-RS. In some examples, in block 1345, the OAM receiver 1310 determines the CSI for OAM mode i for both a communication with data-DMRS MDM and a communication without data-DMRS MDM, and then, in block 1350, transmits a joint CSI report for both communications, or a first CSI report for the communication with data-DMRS MDM and a second CSI report for the communication without data-DMRS MDM.

In some examples, in block 1345, the OAM receiver 1310 determines the CSI for OAM mode i for either a communication with data-DMRS MDM or a communication without data-DMRS MDM based on a first CSI-RS, and then a further iteration of blocks 1335 and 1345 may be performed for the OAM receiver 1310 to determine the CSI for the other of the communication with data-DMRS MDM or the communication without data-DMRS MDM based on a second CSI-RS. The OAM receiver 1310 may then transmit a joint CSI report for both communications, or may transmit a first CSI report for the communication with data-DMRS MDM and a second CSI report for the communication without data-DMRS MDM.

In some examples, where the CSI-RS is mode-multiplexed with data or a DM-RS, the OAM transmitter 1305 may return to block 1335 to transmit a further CSI-RS for the OAM mode i, but, in this instance, transmit the CSI-RS mode-division multiplexed with the other of data or DM-RS that was not transmitted in the previous iteration of block 1335. For example, if the OAM transmitter 1305 previously transmitted the CSI-RS 1340 mode-division multiplexed with a DM-RS, and the OAM receiver 1310 determined the CSI and provided a CSI report for a communication including mode-division multiplexed data with DM-RS (data-DMRS MDM), the OAM transmitter 1305 may return to block 1335 and transmit the further CSI-RS without data-DMRS MDM. For example, the further CSI-RS may be transmitted as part of data that is mode-division multiplexed with other data (rather than a DM-RS). Then, in block 1345, the OAM receiver may determine a CSI for the OAM mode i for the communication including the further CSI-RS transmitted without data-DMRS MDM. Then, in block 1350, the OAM receiver 1310 may transmit the CSI report for the communication including the further CSI-RS transmitted without data-DMRS MDM. Accordingly, after the second iteration through blocks 1335, 1345, and 1350 with respect to OAM mode i, the OAM transmitter 1305 will have received a first and second CSI report from the OAM receiver 1310, the first CSI report for a communication including mode division multiplexing data with other data (data-data MDM) and the second CSI report for a communication including mode division multiplexing data with DM-RS (data-DMRS MDM).

In some examples, rather than transmit the first CSI report separate from the second CSI report, the OAM receiver generates a joint CSI report providing the CSI for both a communication including a CSI-RS without data-DMRS mode division multiplexing and a communication including a CSI-RS with data-DMRS mode division multiplexing. In these examples, the CSI configuration information of block 1325 may configure the OAM receiver to generate and send this joint CSI report, rather than the first and second CSI reports as described above. Additionally, in these examples, the OAM transmitter 1305 may execute block 1335 twice to transmit the CSI-RS and the further CSI-RS, and the OAM receiver 1310 may execute block 1345 twice to determine the CSI for OAM mode i for each CSI-RS communication (one with data-DMRS MDM and one without data-DMRS MDM), before proceeding to block 1350 to generate the joint CSI report. Here, the OAM receiver 3110 may determine the CSI for the CSI-RS 1340 before the OAM transmitter 1305 transmits the further CSI-RS.

After receiving the CSI reports or the joint CSI report, as the case may be, the OAM transmitter 1305 may modify communication parameters for OAM mode i based on the CSIs that the OAM transmitter 1305 receives. For example, the OAM transmitter 1305 may select a new OAM mode or adjust a transmit power to improve channel performance or integrity of the OAM mode i.

FIG. 14 is a flow chart illustrating an exemplary process 1400 at a transmitting device in accordance with some aspects of the present disclosure. As described below, a particular implementation may omit some or all illustrated features, and may not require some illustrated features to implement all embodiments. For purposes of illustration, the process 1400 will be generally described with respect to the OAM transmitter 1105. However, in some examples, another of the above-described transmitting devices (e.g., the transmitter 302, the transmitting device 500, the OAM transmitter 1305, a scheduling entity (e.g., a base station and/or an IAB), or a scheduled entity (e.g., an IAB and/or a UE) may be configured to carry out the process 1400. In some examples, any suitable apparatus or means for carrying out the functions or algorithm described below may carry out the process 1400.

At block 1410, the transmitting device may transmit reference signal (RS) configuration information, such as DM-RS configuration information. In some examples, the RS configuration information can indicate radio resources for a plurality of orbital angular momentum (OAM) modes. For example, with reference to block 1112 of FIG. 11, the OAM transmitter 1105 may transmit the DM-RS configuration information 1115 to the OAM receiver 1110. As described above with respect to block 1112, the DM-RS configuration information may include DM-RS radio resource related parameters and power allocation related parameters. In other words, block 1410 may be implemented by the transmitting device in a similar manner as the OAM transmitter 1105 implements block 1112 of FIG. 11 described above. Accordingly, the description of block 1112 above similarly applies to block 1410 and, for brevity, is not repeated.

In some examples, the timing information indicates that a periodicity for a DM-RS on a first OAM mode is different than a periodicity for a DM-RS on a second OAM mode. In other words, the length of time or number of symbols between each DM-RS on the first OAM mode may be different than the length of time or number of symbols between each DM-RS on the second OAM mode. For example, as shown in FIG. 12, the OAM mode 1 has a DM-RS every 8 symbols, whereas the OAM mode 2 has a DM-RS every 4 symbols and, thus, a shorter periodicity. As noted, generally, an OAM mode with a higher mode index may be less susceptible to interference than an OAM mode with a lower mode index. Accordingly, the OAM mode with the higher mode index may use a longer period between DM-RSs than the OAM mode with the lower mode index. Additionally, based on the DM-RS configuration information, a data-DMRS MDM pattern may be established whereby, like shown in FIG. 12, the transmitter may transmit, and the receiver may receive, communications with data-data MDM, DMRS-DMRS MDM, and data-DMRS MDM at regular intervals.

At block 1420, the transmitting device may transmit data on a first OAM mode of the plurality of OAM modes using first radio resources of the radio resources indicated by the RS configuration information (e.g., indicated by DM-RS configuration information). For example, with reference to block 1128 of FIG. 11, the OAM transmitter 1105 may transmit the PDSCH communication 1130 to the OAM receiver 1110 including data on a first OAM mode and a DM-RS on a second OAM mode. Here, the data on the first OAM mode is an example of the data transmitted in block 1420. In other words, block 1420 may be implemented by the transmitting device in a similar manner as the OAM transmitter 1105 implements block 1128 of FIG. 11 described above. Accordingly, the description of block 1128 above similarly applies to block 1420 and, for brevity, is not repeated.

At block 1430, the scheduling entity can transmit a reference signal (e.g., a DM-RS) on a second OAM mode of the plurality of OAM modes using the first radio resources of the radio resources indicated by the RS configuration information. For example, with reference again to block 1128 of FIG. 11, the OAM transmitter 1105 may transmit the PDSCH communication 1130 to the OAM receiver 1110 including the data on the first OAM mode and the DM-RS on the second OAM mode. Here, the DM-RS on the second OAM mode is an example of the DM-RS transmitted in block 1430. In other words, block 1430 may be implemented by the transmitting device in a similar manner as the OAM transmitter 1105 implements block 1128 of FIG. 11 described above. Accordingly, the description of block 1128 above similarly applies to block 1420 and, for brevity, is not repeated. Further, for clarity, because the data and DM-RS of the PDSCH communication 1130 are mode-division multiplexed, they may be transmitted by the transmitting device simultaneously in the PDSCH communication 1130. Accordingly, blocks 1420 and 1430 may be executed in parallel. In other words, by implementing block 1128 of FIG. 11, the receiving device may implement blocks 1420 and 1430 of FIG. 15.

To transmit the data and DM-RS using OAM communications, the transmitting device implementing the process 1400 may include a uniform circular array (UCA), as described with respect to FIG. 8 or as described with respect to FIG. 9, or may include a spiral phase plate (SPP) for each OAM mode as described with respect to FIG. 7. In the case of the transmitting device including a UCA as described with respect to FIG. 9, in some examples, the transmitting device controls a transceiver to drive a first antenna circle of the UCA to transmit the data on the first OAM mode, and controls the transceiver to transmit the DM-RS on the second OAM mode by driving the first antenna circle or a second antenna circle of the UCA.

In some aspects of the process 1400, the transmitting device further transmits downlink data on the first OAM mode using second radio resources indicated in the DM-RS configuration information; and transmits second downlink data on the second OAM mode using the second radio resources in accordance with the DM-RS configuration information. For example, the transmitting device may transmit first downlink data on the first OAM mode and second downlink data on the second OAM mode using mode division multiplexing, such as described with respect to symbol identifiers #2-4, 6-8, 10-12, 14-16, etc. in FIG. 12.

In some aspects of the process 1400, the transmitting device further transmits a first DM-RS on the first OAM mode using second radio resources indicated in the DM-RS configuration information; and transmits a second DM-RS on the second OAM mode using the second radio resources in accordance with the DM-RS configuration information. For example, the transmitting device may transmit the first DM-RS on the first OAM mode and the second DM-RS on the second OAM mode using mode division multiplexing, such as described with respect to symbol identifiers #1, 9, 17, etc. in FIG. 12.

In some aspects of the process 1400, the transmitting device is further configured to transmit channel state information (CSI) report configuration information. The CSI report configuration information may indicate configuration information for a CSI-RS transmission with data and the DM-RS mode-division multiplexed and for a CSI-RS transmission without data and the DM-RS mode-division multiplexed. For example, the transmitting device may transmit the CSI report configuration information using similar techniques as described above with respect to block 1325 of FIG. 13, where the OAM transmitter 1305 transmits the CSI configuration information 1330 to the OAM receiver 1310.

The transmitting device may further transmit a CSI-reference signal (CSI-RS), for example, as part of a transmission, or to estimate a channel for a transmission, with data and a reference signal (e.g., DM-RS) mode-division multiplexed or as part of a transmission without data and the reference signal (e.g., the DM-RS) mode-division multiplexed. For example, the transmitting device may transmit the CSI-RS using similar techniques as described above with respect to block 1335 of FIG. 13, where the OAM transmitter 1305 transmits the CSI-RS 1340 to the OAM receiver 1310. The transmitting device may further receive a CSI report in accordance with the CSI configuration information. For example, the transmitting device may receive the CSI report using similar techniques as described above with respect to FIG. 13, where the OAM transmitter 1305 receives the CSI report 1355 from the OAM receiver 1310. Additionally, as described above with respect to FIG. 13, the OAM transmitter 1305 may repeat block 1335 to ultimately transmit a CSI-RS on a particular OAM mode i as part of a first communication with data-DMRS MDM and a further CSI-RS on the OAM mode i as part of a second communication without data-DMRS MDM. Accordingly, in some examples, the CSI report is a joint report including CSI values for the transmission with data and the DM-RS mode-division multiplexed and for the transmission without data and the DM-RS mode-division multiplexed. In other examples, the CSI report is a first report including CSI values for the transmission with data and the DM-RS mode-division multiplexed, and the transmitter receives a second CSI report in accordance with the CSI report configuration information, wherein the second CSI report includes CSI values for the transmission without data the DM-RS mode-division multiplexed.

Figure 15:
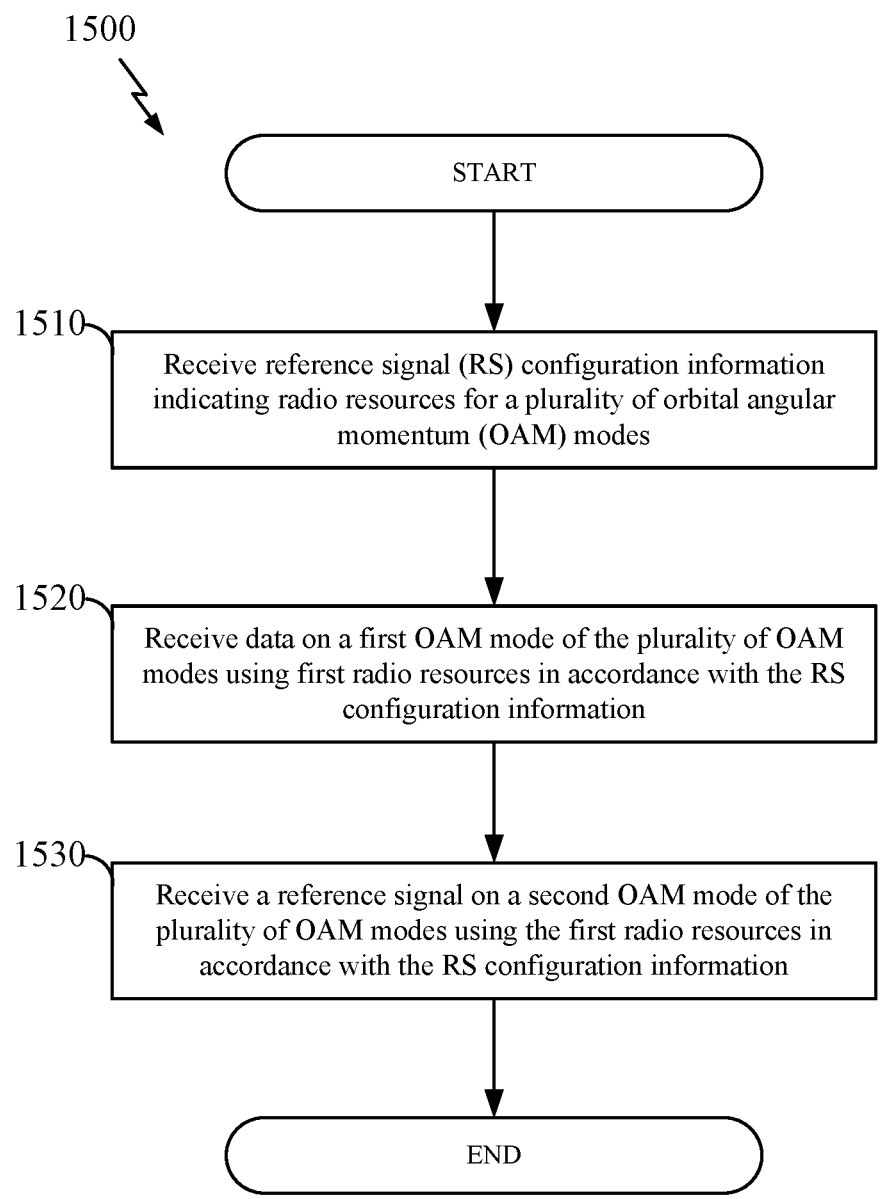
FIG. 15 is a flow chart illustrating an exemplary process at a receiving device for receiving mode-division multiplexed communications according to some aspects of this disclosure.

FIG. 15 is a flow chart illustrating an exemplary process 1500 at a receiving device in accordance with some aspects of the present disclosure. As described below, a particular implementation may omit some or all illustrated features, and may not require some illustrated features to implement all embodiments. For purposes of illustration, the process 1500 will be generally described with respect to the OAM receiver 1110. However, in some examples, another of the above-described receiving devices (e.g., the receiver 306, the receiving device 600, the OAM receiver 1310, a scheduling entity (e.g., a base station and/or an IAB), or a scheduled entity (e.g., an IAB and/or a UE) may be configured to carry out the process 1500. In some examples, any suitable apparatus or means for carrying out the functions or algorithm described below may carry out the process 1500.

At block 1510, the receiving device may receive reference signal (RS) configuration information, such as DM-RS configuration information. In some examples, the RS configuration information can indicate radio resources for a plurality of orbital angular momentum (OAM) modes. For example, with reference to block 1112 of FIG. 11, the OAM transmitter 1105 may transmit the DM-RS configuration information 1115 to the OAM receiver 1110, and the OAM receiver 1110 may receive the DM-RS configuration information 1115. As described above with respect to block 1112, the DM-RS configuration information may include DM-RS radio resource related parameters and power allocation related parameters. In some examples, upon receipt to the DM-RS configuration information, the OAM receiver 1110 processes the information to determine the various information noted above that may be indicated by the DM-RS configuration information (e.g., the timing information, the frequency information, and the transmit power ratios for DM-RS and data). In other words, block 1510 may be implemented by the receiving device in a similar manner as the OAM receiver 1110 receives the DM-RS configuration information 1115 as described above with respect to FIG. 11. Accordingly, the description of the OAM receiver 1110 receiving the DM-RS configuration information 1115 above similarly applies to block 1510 and, for brevity, is not repeated.

In some examples, the timing information indicates that a periodicity for a DM-RS on a first OAM mode is different than a periodicity for a DM-RS on a second OAM mode. In other words, the length of time or number of symbols between each DM-RS on the first OAM mode may be different than the length of time or number of symbols between each DM-RS on the second OAM mode. For example, as shown in FIG. 12, the OAM mode 1 has a DM-RS every 8 symbols, whereas the OAM mode 2 has a DM-RS every 4 symbols and, thus, a shorter periodicity. As noted, generally, an OAM mode with a higher mode index may be less susceptible to interference than an OAM mode with a lower mode index. Accordingly, the OAM mode with the higher mode index may use a longer period between DM-RSs than the OAM mode with the lower mode index. Additionally, based on the DM-RS configuration information, a data-DMRS MDM pattern may be established whereby, like shown in FIG. 12, the transmitter may transmit, and the receiver may receive, communications with data-data MDM, DMRS-DMRS MDM, and data-DMRS MDM at regular intervals.

At block 1520, the receiving device can receive data (e.g., downlink data) on a first OAM mode of the plurality of OAM modes using first radio resources of the radio resources indicated by the RS configuration information. For example, with reference to block 1135 of FIG. 11, the OAM receiver 1110 may receive the PDSCH communication 1130 from the OAM transmitter 1105 including data on a first OAM mode and a DM-RS on a second OAM mode. Here, the data on the first OAM mode is an example of the data received in block 1520. In other words, block 1520 may be implemented by the receiving device in a similar manner as the OAM receiver 1110 implements block 1135 of FIG. 11 described above. Accordingly, the description of block 1135 above similarly applies to block 1520 and, for brevity, is not repeated.

At block 1530, the receiving device can receive a reference signal (e.g., a DM-RS) on a second OAM mode of the plurality of OAM modes using the first radio resources of the radio resources indicated by the RS configuration information. For example, with reference again to block 1135 of FIG. 11, the OAM receiver 1110 may receive the PDSCH communication 1130 from the OAM transmitter 1105 including the data on the first OAM mode and the DM-RS on the second OAM mode. Here, the DM-RS on the second OAM mode is an example of the DM-RS received in block 1530. In other words, block 1530 may be implemented by the receiving device in a similar manner as the OAM receiver 1110 implements block 1135 of FIG. 11 described above. Accordingly, the description of block 1135 above similarly applies to block 1520 and, for brevity, is not repeated. Further, for clarity, because the data and DM-RS of the PDSCH communication 1130 are mode-division multiplexed, they may be received by the receiving device simultaneously upon receipt of the PDSCH communication 1130. Accordingly, blocks 1520 and 1530 may be executed in parallel. In other words, by implementing block 1135 of FIG. 11, the receiving device may implement blocks 1520 and 1530 of FIG. 15.

To receive the data and DM-RS using OAM communications, the receiving device implementing the process 1500 may include a uniform circular array (UCA), as described with respect to FIG. 8 or as described with respect to FIG. 9, or may include a spiral phase plate (SPP) for each OAM mode as described with respect to FIG. 7. In the case of the receiving device including a UCA as described with respect to FIG. 9, in some examples, the receiving device receives the data at a first antenna circle of the UCA to receive the data on the first OAM mode, and receives the DM-RS on the second OAM mode by receiving the DM-RS at the first antenna circle or a second antenna circle of the UCA.

In some aspects of the process 1500, the receiving device further receives downlink data on the first OAM mode using second radio resources indicated in the RS configuration information; and receives second downlink data on the second OAM mode using the second radio resources in accordance with the RS configuration information. For example, the receiving device may receive first downlink data on the first OAM mode and second downlink data on the second OAM mode using mode division multiplexing, such as described with respect to symbol identifiers #2-4, 6-8, 10-12, 14-16, etc. in FIG. 12.

In some aspects of the process 1500, the receiving device further receives a first reference signal (e.g., a first DM-RS)

on the first OAM mode using second radio resources indicated in the RS configuration information; and receives a second reference signal (e.g., a second DM-RS) on the second OAM mode using the second radio resources in accordance with the DM-RS configuration information. For example, the receiving device may receive the first DM-RS on the first OAM mode and the second DM-RS on the second OAM mode using mode division multiplexing, such as described with respect to symbol identifiers #1, 9, 17, etc. in FIG. 12.

In some aspects of the process 1500, the receiving device is further configured to receive channel state information (CSI) report configuration information. The CSI report configuration information may indicate configuration information for a CSI-RS transmission with data and the reference signal (e.g., the DM-RS) mode-division multiplexed and for a CSI-RS transmission without data and the reference signal (e.g., the DM-RS) mode-division multiplexed. For example, the receiving device may receive the CSI report configuration information using similar techniques as described above with respect to FIG. 13, where the OAM receiver 1310 receives the CSI configuration information 1330 from the OAM transmitter 1305.

The receiving device may further receive a CSI-reference signal (CSI-RS), for example, as part of a transmission, or to estimate a channel for a transmission, with data and DM-RS mode-division multiplexed or as part of a transmission without data and DM-RS mode-division multiplexed. For example, the receiving device may receive the CSI-RS using similar techniques as described above with respect to FIG. 13, where the OAM receiver 1310 receives the CSI-RS 1340 from the OAM transmitter 1305. The receiving device may further determine a CSI and transmit a CSI report in accordance with the CSI configuration information and the received CSI-RS. For example, the transmitting device may determine the CSI and transmit the CSI report using similar techniques as described above with respect to blocks 1345 and 1350, respectively. Additionally, as described above with respect to FIG. 13, the OAM transmitter 1305 may repeat block 1335 and the OAM receiver 1310 may repeat blocks 1345 and 1350 to ultimately receive and generate a CSI report for a CSI-RS on a particular OAM mode i as part of a first communication with data-DMRS MDM and a further CSI-RS on the OAM mode i as part of a second communication without data-DMRS MDM. Accordingly, in some examples, the CSI report is a joint report including CSI values for the transmission with data and the DM-RS mode-division multiplexed and for the transmission without data and the DM-RS mode-division multiplexed. In other examples, the CSI report is a first report including CSI values for the transmission with data and the DM-RS mode-division multiplexed, and the receiver transmits a second CSI report in accordance with the CSI report configuration information, wherein the second CSI report includes CSI values for the transmission without data the DM-RS mode-division multiplexed.

Although several of the examples in the description above relate to demodulation reference signals (DM-RS), in some examples, other types of reference signals (e.g., other reference signals used in 5G, 4G, or other communication protocols) are used in place of the DM-RS(s). For example, in some examples, data is mode-division multiplexed with other types of reference signals.

Further Examples Having a Variety of Features

Example 1: A method, apparatus, and non-transitory computer-readable medium for wireless communication, including: a processor; and a transceiver coupled to the processor, wherein the apparatus transmits, via the transceiver, a reference signal (RS) configuration information, the RS configuration information indicating radio resources for a plurality of orbital angular momentum (OAM) modes; transmits, via the transceiver, data on a first OAM mode of the plurality of OAM modes using first radio resources of the radio resources indicated by the RS configuration information; and transmits, via the transceiver, a reference signal on a second OAM mode of the plurality of OAM modes using the first radio resources of the radio resources indicated by the RS configuration information.

Example 2: A method, apparatus, and non-transitory computer-readable medium of example 1, further including a uniform circular array (UCA) coupled to the transceiver, wherein transmitting the data on the first OAM mode and transmitting the reference signal on the second OAM mode includes controlling the transceiver to drive the UCA.

Example 3: A method, apparatus, and non-transitory computer-readable medium of any of examples 1 to 2, wherein transmitting the data on the first OAM mode including controlling the transceiver to drive a first antenna circle of the UCA, and transmitting the reference signal on the second OAM mode includes controlling the transceiver to drive the first antenna circle or a second antenna circle of the UCA.

Example 4: A method, apparatus, and non-transitory computer-readable medium of any of examples 1 to 3, further including: a first antenna coupled to the transceiver, the first antenna including a first aperture and a first spiral phase plate; and a second antenna coupled to the transceiver, the second antenna including a second aperture and a second spiral phase plate, wherein transmitting the data on the first OAM mode includes controlling the transceiver to drive the first antenna, and wherein transmitting the reference signal on the second OAM mode includes controlling the transceiver to drive the second antenna.

Example 5: A method, apparatus, and non-transitory computer-readable medium of any of examples 1 to 4, wherein the reference signal is a demodulation reference signal (DM-RS), wherein the first radio resources comprise a time and frequency resource allocation for DM-RS symbols for each of the first OAM mode and the second OAM mode, wherein the RS configuration information further indicates a power allocation that comprises a transmit power ratio of a DM-RS symbol for the second OAM mode with respect to a data symbol for the first OAM mode, and further including transmitting the data on the first OAM mode and the DM-RS on the second OAM mode in accordance with the transmit power ratio.

Example 6: A method, apparatus, and non-transitory computer-readable medium of any of examples 1 to 5, further including transmitting, via the transceiver, first downlink data on the first OAM mode using second radio resources of the radio resources indicated by the RS configuration information; and transmitting, via the transceiver, second downlink data on the second OAM mode using the second radio resources of the radio resources indicated by the RS configuration information.

Example 7: A method, apparatus, and non-transitory computer-readable medium of any of examples 1 to 6, further including transmitting, via the transceiver, channel state information (CSI) report configuration information, the CSI report configuration information indicating configuration information for a transmission with data and the reference signal mode-division multiplexed and for a transmission without data and the reference signal mode-division multiplexed; transmitting, via the transceiver, a CSI reference signal (CSI-RS); and receiving, via the transceiver, a CSI report based on the CSI-RS and in accordance with the CSI report configuration information.

Example 8: A method, apparatus, and non-transitory computer-readable medium of any of examples 1 to 7, wherein the CSI report is a joint report including CSI values for the transmission with data and the reference signal mode-division multiplexed and for the transmission without data and the reference signal mode-division multiplexed.

Example 9: A method, apparatus, and non-transitory computer-readable medium of any of examples 1 to 7, wherein the CSI report is a first report including CSI values for the transmission with data and the reference signal mode-division multiplexed, and wherein the method, apparatus, and non-transitory computer-readable medium further includes transmitting a second CSI-RS; and receiving, via the transceiver, a second CSI report based on the CSI-RS and in accordance with the CSI report configuration information, wherein the second CSI report includes CSI values for the transmission without data the reference signal mode-division multiplexed.

Example 10: A method, apparatus, and non-transitory computer-readable medium for wireless communication, comprising: a processor; and a transceiver coupled to the processor, wherein the apparatus receives, via the transceiver, reference signal (RS) configuration information, the RS configuration information indicating radio resources for a plurality of orbital angular momentum (OAM) modes; receives, via the transceiver, data on a first OAM mode of the plurality of OAM modes using first radio resources in accordance with the RS configuration information; and receives, via the transceiver, a reference signal on a second OAM mode of the plurality of OAM modes using the first radio resources in accordance with the RS configuration information.

Example 11: A method, apparatus, and non-transitory computer-readable medium of example 12, further comprising a uniform circular array (UCA) coupled to the transceiver, wherein the apparatus is configured to: receive the data on the first OAM mode on a first antenna circle of the UCA, and receive the reference signal on the second OAM mode on the first antenna circle or a second antenna circle of the UCA.

Example 12: A method, apparatus, and non-transitory computer-readable medium of any of examples 10 to 11, further including a first antenna coupled to the transceiver, the first antenna including a first aperture and a first spiral phase plate, wherein the apparatus receives the data on the first OAM mode via the first antenna; and a second antenna coupled to the transceiver, the second antenna including a second aperture and a second spiral phase plate, wherein the apparatus receives the reference signal on the second OAM mode via the second antenna.

Example 13: A method, apparatus, and non-transitory computer-readable medium of any of examples 10 to 12, wherein the reference signal is a demodulation reference signal (DM-RS), wherein the first radio resources comprise a time and frequency resource allocation for DM-RS symbols for each of the first OAM mode and the second OAM mode, wherein the RS configuration information further indicates a power allocation that comprises a transmit power ratio of a DM-RS symbol for the second OAM mode with respect to a data symbol for the first OAM mode.

Example 14: A method, apparatus, and non-transitory computer-readable medium of any of examples 10 or 13, the apparatus further determines a data transmit power for the data based on the transmit power ratio; and determines a DM-RS transmit power for the DM-RS based on the transmit power ratio.

Example 15: A method, apparatus, and non-transitory computer-readable medium of any of examples 10 or 14, the apparatus further receives, via the transceiver, first downlink data on the first OAM mode using second radio resources of the radio resources indicated by the RS configuration information; and receives, via the transceiver, second downlink data on the second OAM mode using the second radio resources of the radio resources indicated by the RS configuration information.

Example 16: A method, apparatus, and non-transitory computer-readable medium of any of examples 10 or 15, the apparatus further receives, via the transceiver, channel state information (CSI) report configuration information, the CSI report configuration information indicating configuration information for a transmission with data and the reference signal mode-division multiplexed and for a transmission without data and the reference signal mode-division multiplexed; receives, via the transceiver, a first CSI reference signal (CSI-RS) for the first OAM mode; determines a first CSI for the first OAM mode based on the first CSI-RS and power allocation parameters indicated by the RS configuration information; and transmit, via the transceiver, a CSI report based on the first CSI and in accordance with the CSI report configuration information.

Example 17: A method, apparatus, and non-transitory computer-readable medium of any of examples 10 or 16, wherein the apparatus further receives, via the transceiver, a second CSI-RS for the first OAM mode; and determines a second CSI for the first OAM mode based on the second CSI-RS and the power allocation parameters indicated by the RS configuration information, wherein the CSI report is a joint report for the first OAM mode based on the first CSI and the second CSI and including CSI values for the transmission with data and the reference signal mode-division multiplexed and for the transmission without data and the reference signal mode-division multiplexed.

Example 18: A method, apparatus, and non-transitory computer-readable medium of any of examples 10 or 16, wherein the CSI report is a first report including CSI values for the transmission with data and the reference signal mode-division multiplexed, and wherein the apparatus further: receives, via the transceiver, a second CSI-RS for the first OAM mode; determines a second CSI for the first OAM mode based on power allocation parameters indicated by the RS configuration information; and transmits, via the transceiver, a second CSI report for the first OAM mode based on the second CSI and in accordance with the CSI report configuration information, wherein the second CSI report includes CSI values for the transmission without data the reference signal mode-division multiplexed.

This disclosure presents several aspects of a wireless communication network with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO).

Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The present disclosure uses the terms "coupled" and/or "communicatively coupled" to refer to a direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Applicant provides this description to enable any person skilled in the art to practice the various aspects described herein. Those skilled in the art will readily recognize various modifications to these aspects, and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus configured for wireless communication, comprising:
 a processor; and
 a transceiver coupled to the processor,
 wherein the apparatus is configured to:
  transmit, via the transceiver, a reference signal (RS) configuration information, the RS configuration information indicating radio resources for a plurality of orbital angular momentum (OAM) modes;
  transmit, via the transceiver, data on a first OAM mode of the plurality of OAM modes using first radio resources of the radio resources indicated by the RS configuration information; and
  transmit, via the transceiver, a reference signal on a second OAM mode of the plurality of OAM modes using the first radio resources of the radio resources indicated by the RS configuration information.

2. The apparatus of claim 1, further comprising a uniform circular array (UCA) coupled to the transceiver,
 wherein, to transmit the data on the first OAM mode and to transmit the reference signal on the second OAM mode, the apparatus is configured to control the transceiver to drive the UCA.

3. The apparatus of claim 2,
 wherein, to transmit the data on the first OAM mode, the apparatus is configured to control the transceiver to drive a first antenna circle of the UCA, and
 wherein, to transmit the reference signal on the second OAM mode, the apparatus is configured to control the transceiver to drive the first antenna circle or a second antenna circle of the UCA.

4. The apparatus of claim 1, further comprising:
 a first antenna coupled to the transceiver, the first antenna including a first aperture and a first spiral phase plate; and
 a second antenna coupled to the transceiver, the second antenna including a second aperture and a second spiral phase plate,
 wherein, to transmit the data on the first OAM mode, the apparatus is configured to control the transceiver to drive the first antenna, and
 wherein, to transmit the reference signal on the second OAM mode, the apparatus is configured to control the transceiver to drive the second antenna.

5. The apparatus of claim 1, wherein the reference signal is a demodulation reference signal (DM-RS),
 wherein the first radio resources comprise a time and frequency resource allocation for DM-RS symbols for each of the first OAM mode and the second OAM mode,
 wherein the RS configuration information further indicates a power allocation that comprises a transmit power ratio of a DM-RS symbol for the second OAM mode with respect to a data symbol for the first OAM mode, and wherein the apparatus is further configured to transmit the data on the first OAM mode and the DM-RS on the second OAM mode in accordance with the transmit power ratio.

6. The apparatus of claim 1, the apparatus further configured to:
transmit, via the transceiver, first downlink data on the first OAM mode using second radio resources of the radio resources indicated by the RS configuration information; and
transmit, via the transceiver, second downlink data on the second OAM mode using the second radio resources of the radio resources indicated by the RS configuration information.

7. The apparatus of claim 1, the apparatus further configured to:
transmit, via the transceiver, channel state information (CSI) report configuration information, the CSI report configuration information indicating configuration information for a transmission with data and the reference signal mode-division multiplexed and for a transmission without data and the reference signal mode-division multiplexed;
transmit, via the transceiver, a CSI reference signal (CSI-RS); and
receive, via the transceiver, a CSI report based on the CSI-RS and in accordance with the CSI report configuration information.

8. The apparatus of claim 7, wherein the CSI report is a joint report including CSI values for the transmission with data and the reference signal mode-division multiplexed and for the transmission without data and the reference signal mode-division multiplexed.

9. The apparatus of claim 7,
wherein the CSI report is a first report including CSI values for the transmission with data and the reference signal mode-division multiplexed,
wherein the apparatus is further configured to:
transmit a second CSI-RS; and
receive, via the transceiver, a second CSI report based on the CSI-RS and in accordance with the CSI report configuration information, wherein the second CSI report includes CSI values for the transmission without data the reference signal mode-division multiplexed.

10. A method for wireless communication, comprising:
transmitting, via a transceiver, reference signal (RS) configuration information, the RS configuration information indicating radio resources for a plurality of orbital angular momentum (OAM) modes;
transmitting, via the transceiver, data on a first OAM mode of the plurality of OAM modes using first radio resources of the radio resources indicated by the RS configuration information; and
transmitting, via the transceiver, a reference signal on a second OAM mode of the plurality of OAM modes using the first radio resources of the radio resources indicated by the RS configuration information.

11. The method of claim 10, further comprising:
driving, via the transceiver, a uniform circular array (UCA) to transmit the data on the first OAM mode and the reference signal on the second OAM mode or
driving, via the transceiver, a first antenna including a first aperture and a first spiral phase plate to transmit the data on the first OAM mode and driving, via the transceiver, a second antenna including a second aperture and a second spiral phase plate to transmit the reference signal on the second OAM mode.

12. The method of claim 10, wherein the reference signal is a demodulation reference signal (DM-RS),
wherein the first radio resources comprise a time and frequency resource allocation for DM-RS symbols for each of the first OAM mode and the second OAM mode,
wherein the RS configuration information further indicates a power allocation that comprises a transmit power ratio of a DM-RS symbol for the second OAM mode with respect to a data symbol for the first OAM mode, and
wherein transmitting the data on the first OAM mode and the DM-RS on the second OAM mode includes transmitting the data and the DM-RS in accordance with the transmit power ratio.

13. The method of claim 10,
transmitting, via the transceiver, first downlink data on the first OAM mode using second radio resources of the radio resources indicated by the RS configuration information; and
transmitting, via the transceiver, second downlink data on the second OAM mode using the second radio resources of the radio resources indicated by the RS configuration information.

14. The method of claim 10,
transmitting, via the transceiver, channel state information (CSI) report configuration information, the CSI report configuration information indicating configuration information for a transmission with data and the reference signal mode-division multiplexed and for a transmission without data and the reference signal mode-division multiplexed;
transmitting, via the transceiver, a CSI reference signal (CSI-RS); and
receiving, via the transceiver, a CSI report based on the CSI-RS and in accordance with the CSI report configuration information.

15. The method of claim 14,
wherein the CSI report is a joint report including CSI values for the transmission with data and the reference signal mode-division multiplexed and for the transmission without data and the reference signal mode-division multiplexed, or
wherein the CSI report is a first report including CSI values for the transmission with data and the reference signal mode-division multiplexed, and the method further comprises:
transmitting, via the transceiver, a second CSI-RS; and
receiving, via the transceiver, a second CSI report in accordance with the CSI report configuration information, wherein the second CSI report includes CSI values for the transmission without data the reference signal mode-division multiplexed.

16. An apparatus configured for wireless communication, comprising:
a processor; and
a transceiver coupled to the processor,
wherein the apparatus is configured to:
receive, via the transceiver, reference signal (RS) configuration information, the RS configuration information indicating radio resources for a plurality of orbital angular momentum (OAM) modes;

receive, via the transceiver, data on a first OAM mode of the plurality of OAM modes using first radio resources in accordance with the RS configuration information; and receive, via the transceiver, a reference signal on a second OAM mode of the plurality of OAM modes using the first radio resources in accordance with the RS configuration information.

17. The apparatus of claim 16, further comprising a uniform circular array (UCA) coupled to the transceiver, wherein the apparatus is configured to:

receive the data on the first OAM mode on a first antenna circle of the UCA, and receive the reference signal on the second OAM mode on the first antenna circle or a second antenna circle of the UCA.

18. The apparatus of claim 16, further comprising a first antenna coupled to the transceiver, the first antenna including a first aperture and a first spiral phase plate, wherein the apparatus is configured to receive the data on the first OAM mode via the first antenna; and a second antenna coupled to the transceiver, the second antenna including a second aperture and a second spiral phase plate, wherein the apparatus is configured to receive the reference signal on the second OAM mode via the second antenna.

19. The apparatus of claim 16, wherein the reference signal is a demodulation reference signal (DM-RS), wherein the first radio resources comprise a time and frequency resource allocation for DM-RS symbols for each of the first OAM mode and the second OAM mode, wherein the RS configuration information further indicates a power allocation that comprises a transmit power ratio of a DM-RS symbol for the second OAM mode with respect to a data symbol for the first OAM mode.

20. The apparatus of claim 19, the apparatus further configured to:

determine a data transmit power for the data based on the transmit power ratio; and determine a DM-RS transmit power for the DM-RS based on the transmit power ratio.

21. The apparatus of claim 16, the apparatus further configured to:

receive, via the transceiver, first downlink data on the first OAM mode using second radio resources of the radio resources indicated by the RS configuration information; and receive, via the transceiver, second downlink data on the second OAM mode using the second radio resources of the radio resources indicated by the RS configuration information.

22. The apparatus of claim 16, the apparatus further configured to:

receive, via the transceiver, channel state information (CSI) report configuration information, the CSI report configuration information indicating configuration information for a transmission with data and the reference signal mode-division multiplexed and for a transmission without data and the reference signal mode-division multiplexed;

receive, via the transceiver, a first CSI reference signal (CSI-RS) for the first OAM mode;

determine a first CSI for the first OAM mode based on the first CSI-RS and power allocation parameters indicated by the RS configuration information; and transmit, via the transceiver, a CSI report based on the first CSI and in accordance with the CSI report configuration information.

23. The apparatus of claim 22, wherein the apparatus is further configured to:

receive, via the transceiver, a second CSI-RS for the first OAM mode; and determine a second CSI for the first OAM mode based on the second CSI-RS and the power allocation parameters indicated by the RS configuration information, wherein the CSI report is a joint report for the first OAM mode based on the first CSI and the second CSI and including CSI values for the transmission with data and the reference signal mode-division multiplexed and for the transmission without data and the reference signal mode-division multiplexed.

24. The apparatus of claim 22, wherein the CSI report is a first report including CSI values for the transmission with data and the reference signal mode-division multiplexed, and wherein the apparatus is further configured to:

receive, via the transceiver, a second CSI-RS for the first OAM mode;

determine a second CSI for the first OAM mode based on power allocation parameters indicated by the RS configuration information; and transmit, via the transceiver, a second CSI report for the first OAM mode based on the second CSI and in accordance with the CSI report configuration information, wherein the second CSI report includes CSI values for the transmission without data the reference signal mode-division multiplexed.

25. A method for wireless communication, comprising:

receiving, via a transceiver, reference signal (RS) configuration information, the RS configuration information indicating radio resources for a plurality of orbital angular momentum (OAM) modes;

receiving, via the transceiver, data on a first OAM mode of the plurality of OAM modes using first radio resources of the radio resources indicated by the -RS configuration information; and receiving, via the transceiver, a reference signal on a second OAM mode of the plurality of OAM modes using the first radio resources of the radio resources indicated by the RS configuration information.

26. The method of claim 25, wherein receiving the data on the first OAM mode and the reference signal on the second OAM mode via the transceiver further comprises receiving the data and the reference signal via a uniform circular array (UCA), or wherein receiving the data on the first OAM mode via the transceiver further comprises receiving the data via a first antenna that includes a first aperture and a first spiral phase plate to, and receiving the reference signal on the second OAM mode via the transceiver further comprises receiving the reference signal via a second antenna that includes a second aperture and a second spiral phase plate.

27. The method of claim 25, wherein the reference signal is a demodulation reference signal (DM-RS), wherein the first radio resources comprise a time and frequency resource allocation for DM-RS symbols for each of the first OAM mode and the second OAM mode, and wherein the RS configuration information further indicates a power allocation that comprises a transmit power ratio of a DM-RS symbol for the second OAM mode with respect to a data symbol for the first OAM mode.

28. The method of claim 27, further comprising:
determining a data transmit power for the data based on the transmit power ratio; and
determining a DM-RS transmit power for the DM-RS based on the transmit power ratio.

29. The method of claim 25,
receiving, via the transceiver, first downlink data on the first OAM mode using second radio resources of the radio resources indicated by the RS configuration information; and
receiving, via the transceiver, second downlink data on the second OAM mode using the second radio resources of the radio resources indicated by the RS configuration information.

30. The method of claim 25,
receiving, via the transceiver, channel state information (CSI) report configuration information, the CSI report configuration information indicating configuration information for a transmission with data and the reference signal mode-division multiplexed and for a transmission without data and the reference signal mode-division multiplexed;
receiving, via the transceiver, a CSI reference signal (CSI-RS) for the first OAM mode;
determining a CSI for the first OAM mode based on the CSI-RS and power allocation parameters indicated by the RS configuration information; and
transmitting, via the transceiver, a CSI report based on the CSI and in accordance with the CSI report configuration information.

* * * * *